United States Patent
Bortolini et al.

(10) Patent No.: US 7,079,723 B2
(45) Date of Patent: Jul. 18, 2006

(54) OPTICAL WAVELENGTH CROSS CONNECT ARCHITECTURES USING WAVELENGTH ROUTING ELEMENTS

(75) Inventors: Edward J. Bortolini, Nederland, CO (US); Dirk Barthel, Westminster, CO (US); Robert T. Weverka, Boulder, CO (US); Rainer Iraschko, Calgary (CA); George David Morley, Calgary (CA)

(73) Assignee: PTS Corporation, San Jose, CA (US)

( * ) Notice: Subject to any disclaimer, the term of this patent is extended or adjusted under 35 U.S.C. 154(b) by 637 days.

(21) Appl. No.: 10/093,844

(22) Filed: Mar. 8, 2002

(65) Prior Publication Data

US 2003/0170025 A1 Sep. 11, 2003

(51) Int. Cl.
*G02B 6/26* (2006.01)

(52) U.S. Cl. .............................. 385/16; 385/17; 385/24

(58) Field of Classification Search ............ 385/15–18, 385/24, 31, 37
See application file for complete search history.

(56) References Cited

U.S. PATENT DOCUMENTS

| | | | |
|---|---|---|---|
| 5,414,540 A | 5/1995 | Patel et al. | |
| 5,471,332 A | 11/1995 | Shiragaki et al. | |
| 5,495,476 A * | 2/1996 | Kumar | 370/388 |
| 5,838,848 A | 11/1998 | Laude | |
| 5,878,177 A | 3/1999 | Karasan et al. | |
| 5,912,748 A * | 6/1999 | Wu et al. | 398/49 |
| 5,917,625 A | 6/1999 | Ogusu et al. | |
| 5,960,133 A | 9/1999 | Tomlinson | |
| 5,999,672 A | 12/1999 | Hunter et al. | |
| 6,097,519 A | 8/2000 | Ford et al. | |
| 6,097,859 A | 8/2000 | Solgaard et al. | |
| 6,108,471 A | 8/2000 | Zhang et al. | |
| 6,154,583 A * | 11/2000 | Kuroyanagi et al. | 385/16 |
| 6,307,653 B1 | 10/2001 | Bala et al. | |
| 6,307,657 B1 | 10/2001 | Ford | |
| 6,449,073 B1 | 9/2002 | Huber | |
| 6,535,319 B1 * | 3/2003 | Buzzetta et al. | 359/225 |
| 6,535,664 B1 * | 3/2003 | Anderson | 385/18 |
| 6,690,853 B1 * | 2/2004 | Alaimo et al. | 385/24 |
| 6,750,655 B1 * | 6/2004 | Staple et al. | 324/415 |
| 6,766,081 B1 * | 7/2004 | Weaver et al. | 385/39 |
| 6,845,187 B1 * | 1/2005 | Weaver et al. | 385/18 |
| 6,850,515 B1 * | 2/2005 | Chang et al. | 370/352 |

(Continued)

OTHER PUBLICATIONS

U.S. Appl. No. 09/442,061, filed Nov. 16, 1999, Weverka et al.

(Continued)

*Primary Examiner*—Juliana Kang
(74) *Attorney, Agent, or Firm*—Townsend and Townsend and Crew LLP

(57) ABSTRACT

An optical wavelength cross connect is provided to receive multiple input optical signals that each have multiple spectral bands and to transmit multiple output optical signals that each have one or more of those spectral bands. The optical wavelength cross connect includes multiple wavelength routing elements, which are optical components that selectively route wavelength components between one optical signal and multiple optical signals in either direction according to a configurable state. As used within the optical wavelength cross connect, each of the wavelength routing elements receives at least one optical signal corresponding to one of the input optical signals. A mapping of the spectral bands to the output optical signals is determined by the states of the wavelength routing elements.

25 Claims, 17 Drawing Sheets

U.S. PATENT DOCUMENTS

| | | | |
|---|---|---|---|
| 6,868,205 B1* | 3/2005 | Weverka et al. | 385/31 |
| 6,873,447 B1* | 3/2005 | Buzzetta | 359/224 |
| 6,873,755 B1* | 3/2005 | Anderson et al. | 385/18 |
| 6,873,758 B1* | 3/2005 | Carter et al. | 385/24 |
| 6,954,563 B1* | 10/2005 | Kaplan | 385/24 |
| 2002/0015551 A1* | 2/2002 | Tsuyama et al. | 385/17 |
| 2002/0097463 A1* | 7/2002 | Saunders et al. | 359/124 |

OTHER PUBLICATIONS

Ford, Joseph E., et al., "Wavelength Add-Drop Switching Using Tilting Micromirrors," Journal of Lightwave Technology, vol. 17, No. 5, May 1999.

Grade, John D., et al., "A Large-Deflection Electrostatic Actuator for Optical Switching Applications," Solid-State Sensor and Actuator Workshop, Hilton Head, SC, Jun. 4-8, 2000.

Nishi, I., et al., "Broad-Passband-Width Optical Filter for Multi/Demultiplexer Using a Diffraction Grating and a Retroreflector Prism," Electronics Letters, vol. 21, No. 10, May 9, 1985.

Phillippe, P., et al., "Wavelength demultiplexer: using echelette gratings on silicon substrate," Applied Optics, vol. 24, No. 7, Apr. 1, 1985.

Rallison, R.D., "Dense Wavelength Division Multiplexing (DWDM) and the Dickson Grating," White Paper, Jan. 6, 2001.

Sun, Z. J., et al. "Demultiplexer with 120 Channels and 0.29-nm Channel Spacing," IEEE Photonics Technology Letters, vol. 10, No. 1, Jan. 1998.

* cited by examiner

OPTICAL WAVELENGTH CROSS CONNECT ARCHITECTURES USING WAVELENGTH ROUTING ELEMENTS

CROSS REFERENCE TO RELATED APPLICATION

This application is related to concurrently filed, commonly assigned U.S. Pat. Appl. Ser. No, 10/093,943, now issued as U.S. Pat. No. 6,813,408, entitled "METHODS FOR PERFORMING IN-SERVICE UPGRADES OF OPTICAL WAVELENGTH CROSS CONNECTS" by Edward J. Bortolini, the entire disclosure of which is herein incorporated by reference in its entirety for all purposes.

BACKGROUND OF THE INVENTION

This application relates generally to fiber-optic communications. This application relates more specifically to optical wavelength cross-connect architectures used in fiber-optics applications.

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today DWDM systems employing up to 80 channels are available from multiple manufacturers, with more promised in the future.

In all telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are currently performed by electronics—typically an electronic SONET/SDH system. However, multi-wavelength systems generally require multiple SONET/SDH systems operating in parallel to process the many optical channels. This makes it difficult and expensive to scale DWDM networks using SONET/SDH technology. The alternative is an all-optical network. Optical networks designed to operate at the wavelength level are commonly called "wavelength routing networks" or "optical transport networks" (OTN). In a wavelength routing network, the individual wavelengths in a DWDM fiber must be manageable.

Optical wavelength cross connects are configured generally to redirect the individual optical channels on a plurality of input optical fibers to a plurality of output optical fibers. Each incoming channel may be directed to any of the output optical fibers depending on a state of the cross connect. Thus, where there are P input fibers and Q output fibers, the optical wavelength cross connect between them may be considered to be a "PN×QN optical switch." Sometimes herein, the terminology "P×Q optical wavelength cross connect" is used to refer to such a cross connect by referring to the numbers of input and output optical fibers, each of which is understood to have the capacity for carrying N channels. As such the "P×Q optical wavelength cross connect" terminology may be considered to be a shorthand for describing a arbitrarily configurable PN×QN optical device.

FIG. 1 provides an example of a prior-art 4×4 optical wavelength cross connect 100 for a DWDM system carrying N individual wavelength channels. Each of the N channels on the four input signals 104 may be redistributed in accordance with a state of the cross connect 100 among the four output signals 116. The cross connect 100 functions by splitting each of the input signals 104($i$) with an optical demultiplexer 108($i$) into N signals 120(1 . . . N, i) that carry only a single wavelength channel $\lambda_{1 \ldots N}$. From each of the optical demultiplexers 108, the signal corresponding to a particular one of the 120($j$, 1 . . . 4) is directed to a respective one of N 4×4 optical space switches 110($j$). Each optical space switch 110 may be configured as desired to redirect the four received signals 120 to four transmitted signals 124. The transmitted signals 124 are transmitted to optical multiplexers 112 that recombine the reordered individual-wavelength signals onto the four output signals 116.

The efficiency of an arrangement such as shown in FIG. 1 is limited because it adopts a brute-force-type approach of demultiplexing the four incoming signals into their individual 4N components in order to reroute them. There is a general need in the art for more efficient optical wavelength cross-connect architectures without compromising complete routing flexibility.

BRIEF SUMMARY OF THE INVENTION

Embodiments of the invention thus provide optical wavelength cross-connect architectures having such routing flexibility. In one set of embodiments, an optical wavelength cross connect is provided that receives a plurality of input optical signals that each have a plurality of spectral bands and transmits a plurality of output optical signals that each have one or more of the spectral bands. The optical wavelength cross connect comprises a first plurality of wavelength routing elements. Each of the wavelength routing elements is an optical component adapted for selectively routing wavelength components between a first optical signal and a plurality of second optical signals according to a configurable state. In general, a wavelength routing element may be configured to receive the first optical signal and route the spectral bands to the plurality of second optical signals or may be configured to receive the plurality of second optical signals and route the spectral bands to the first optical signal. As used within the optical wavelength cross connect, each of the first plurality of wavelength routing elements is disposed to receive at least one optical signal corresponding to one of the input optical signals. A mapping of the spectral bands comprised by the plurality of input optical signals to the plurality of output optical signals is determined by the states of the first plurality of wavelength routing elements. The wavelength routing elements may generally be configured in any fashion, and may include, for example, four-pass or two-pass wavelength routing elements.

The optical wavelength cross connect may include both working and protection fabrics, with at least one of the first plurality of wavelength routing elements comprised by the protection fabric and the remainder comprised by the working fabric. A plurality of working optical switches are configured to transmit the output optical signals by selecting either a corresponding working signal from the working fabric or a protection signal from the protection fabric. The protection fabric may also include an optical switch for selecting to which of the working optical switches any protection signal should be directed. Either or both of the working and protection fabrics may also include optical amplifiers disposed to amplify the working and/or protection signal prior to transmission to the working optical switches.

The signals received by the wavelength routing elements in the cross connect will generally be either the input signals directly or will be equivalents of the input signals resulting from splitting the input optical signals with optical splitters. Such optical splitters may also be disposed to direct equivalents of the input optical signals to the protection fabric. In some embodiments, the optical splitters provide equivalents of every input signal to every one of the first plurality of wavelength routing elements. The working and protection signals are thus defined directly by the respective states of the wavelength routing elements. In another embodiment, the optical splitters provide an equivalent of only one of the input optical signals to each of the wavelength routing elements on the working fabric but provide equivalents of all the input optical signals to the wavelength routing element(s) on the protection fabric. In such an embodiment, a second plurality of wavelength routing elements is disposed to receive each of the outputs from the first plurality of working-fabric wavelength routing elements. The outputs from the second plurality of wavelength routing elements thus correspond to the output optical signals.

The cross connect may also be equipped with additional optical equipment in alternative embodiments. For example, in one embodiment, a plurality of optical performance monitors are disposed to measure optical characteristics of various signals, such as of the input optical signals, the output optical signals, or any of the signals propagated through different points of the working and/or protection fabrics. In another embodiment, optical supervisory channels may be disposed to drop spectral bands from the input optical signals or to add spectral bands to the output optical signals. Such optical supervisory drops and adds may be useful where the wavelength routing elements are configured according to a predetermined wavelength grid and the dropped or added spectral bands to not correspond to position on the predetermined grid.

In still further embodiments, arrays of smaller cross connects configured using wavelength routing elements may be arranged to provide larger cross-connect functions. For example, a K×K optical wavelength cross connect may be configured to distribute spectral bands comprised by K input optical signals among K output optical signals as an array of interconnected optical wavelength cross connects, at least one of which is smaller than K×K. The mapping of the spectral bands from the input ports to the output ports is determined by states of the interconnected optical wavelength cross connects. Examples of array configurations that may be used include crossbar arrays, Benes arrays, Benes arrays with spatial dilation, and Clos arrays. In one embodiment, a generalized Clos array is used in which the array comprises three layers. The first layer has a plurality m of k×n optical wavelength cross connects, the second layer has a plurality k of m×m optical wavelength cross connects, and the third layer has a plurality m of n×k optical wavelength cross connects. Each optical wavelength cross connect in the second layer receives an intermediate input signal from each of the optical wavelength cross connects included in the first layer and transmits an intermediate optical signal to each of the optical wavelength cross connects included in the third layer. In one embodiment, k=2n−1.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and is enclosed in parentheses to denote one of multiple similar components. When reference is made to a reference numeral without specification to an existing sublabel, it is intended to refer to all such multiple similar components.

DETAILED DESCRIPTION OF THE INVENTION

1. Introduction

Figure 1:
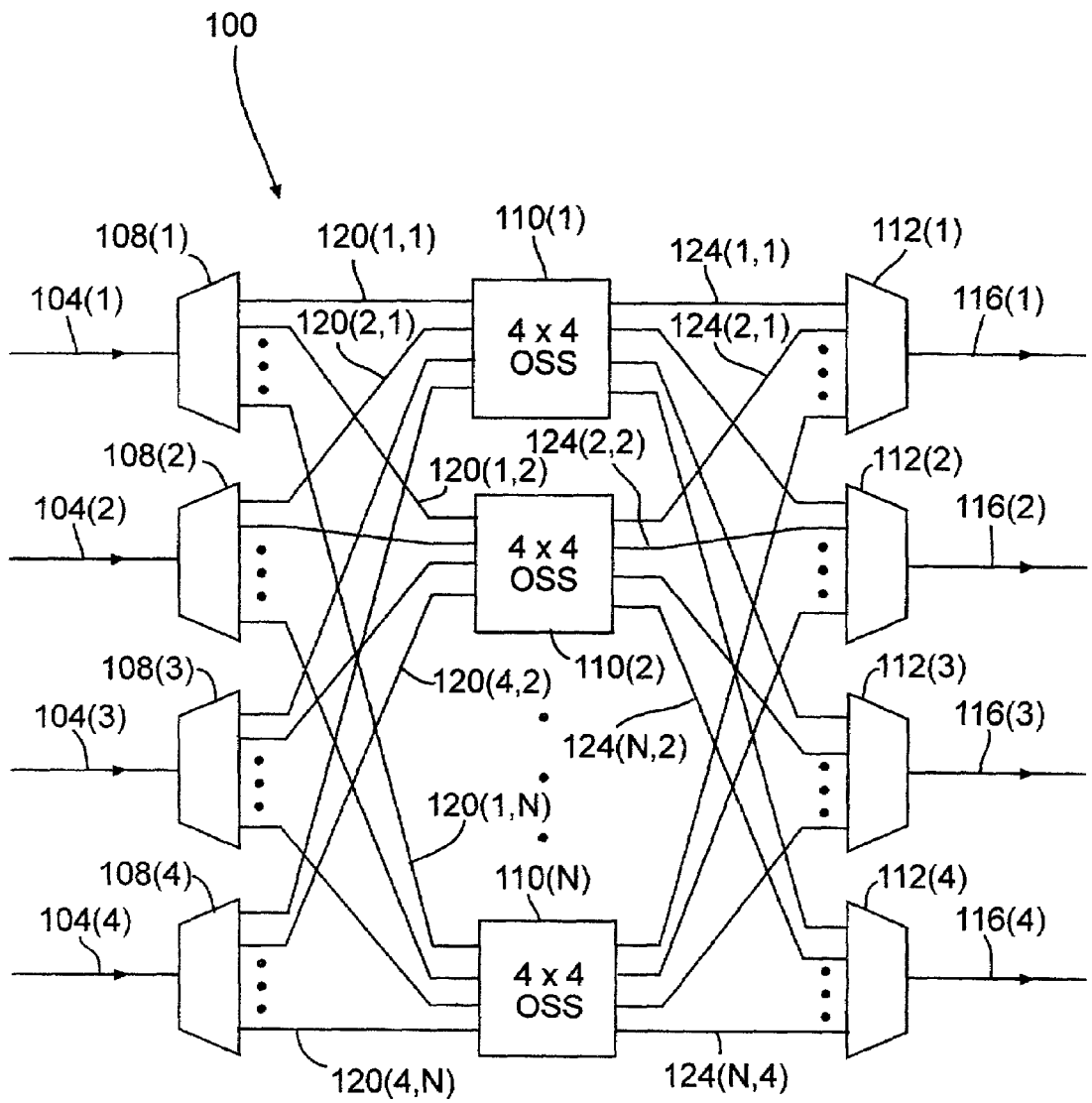
FIG. 1 is a schematic diagram illustrating a prior-art cross connect used in DWDM applications.

The following description sets forth embodiments of optical wavelength cross-connect architectures according to the invention. The general operation of such cross-connect architectures is to receive P input signals at respective input ports and output Q output signals at respective output ports. Each of the input and output signals comprises a plurality of spectral bands, with the cross connect capable of achieving a configuration that results in a desired redistribution of input spectral bands corresponding to equivalent channels among the output signals. Although the signals could each have a continuous spectrum, adjacent segments of which could be considered different spectral bands, it is generally contemplated that the spectrum of the incoming light will have a plurality of spaced bands, denoted as corresponding to channels 1, 2, 3, . . . N. In some instances, the examples provided herein focus on symmetric cross connects in which P=Q, but this is not a requirement and embodiments of the invention may readily be adapted to nonsymmetric cross connects also.

The terms "input port" and "output port" are intended to have broad meanings. At the broadest, a port is defined by a point where light enters or leaves the system. For example, the input (or output) port could be the location of a light source (or detector) or the location of the downstream end of an input fiber (or the upstream end of an output fiber). In specific embodiments, the structure at the port location could include a fiber connector to receive the fiber, or could include the end of a fiber pigtail, the other end of which is connected to outside components. The optical character of the system also permits the input ports and output ports to be interchanged functionally, permitting, for example, a P×Q element to be used as a Q×P element.

The International Telecommunications Union (ITU) has defined a standard wavelength grid having a frequency band centered at 194,100 GHz, and another band at every 50 GHz interval around 194,100 GHz. This corresponds to a wavelength spacing of approximately 0.4 nm around a center wavelength of approximately 1550 nm, it being understood that the grid is uniform in frequency and only approximately uniform in wavelength. Embodiments of the invention are preferably designed for the ITU grid, but finer frequency intervals of 25 GHz and 100 GHz (corresponding to wavelength spacings of approximately 0.2 nm and 0.8 nm) are also of interest.

2. Wavelength Routing Element

Embodiments of the invention for an optical wavelength cross connect include one or more wavelength routing elements ("WRE"). As used herein, a "1×L WRE" refers to an optical device that receives multiplexed light at a WRE input port and redirects subsets of the spectral bands comprised by the multiplexed light to respective ones of a plurality L of WRE output ports. Such a 1×L WRE may be operated as an L×1 WRE by interchanging the functions of the input and output ports. Specifically, a plurality L of optical signals, each multiplexed according to the same wavelength grid are provided at the L output ports (functioning as input ports). A single optical signal is output at the input port (functioning as an output port) and includes spectral bands selected from the L multiplexed optical signals according to the wavelength grid. Thus, the single output optical signal has, at each position on the wavelength grid, no more than one spectral band received at the same position on the wavelength grid from the L multiplexed optical signals. Accordingly, reference herein to a WRE adapted for routing wavelength components "between" a first optical signal and a plurality of second optical signals is intended to include a WRE configured to operate as a 1×L WRE or a WRE configured to operate as an L×1 WRE.

Embodiments for the cross connects that use a WRE may generally use any configuration for routing subsets of a plurality of spectral bands that achieve these functions. In some instances, a particular WRE may be provided in a one-pass, two-pass, four-pass, or other configuration. Some examples of suitable WREs are described in detail below, and additional examples of WREs that may be comprised by certain embodiments are described in the copending, commonly assigned U.S. patent application, filed Nov. 16, 1999 and assigned Ser. No. 09/442,061 ("the '061 application"), entitled "Wavelength Router," by Robert T. Weverka et al., which is herein incorporated by reference in its entirety, including the Appendix, for all purposes.

In some embodiments, wavelength routing functions within the WRE may be performed optically with a free-space optical train disposed between the WRE input port and the WRE output ports, and a routing mechanism. The free-space optical train can include air-spaced elements or can be of generally monolithic construction. The optical train includes a dispersive element such as a diffraction grating. The routing mechanism includes one or more routing elements and cooperates with the other elements in the optical train to provide optical paths that couple desired subsets of the spectral bands to desired WRE output ports. The routing elements are disposed to intercept the different spectral bands after they have been spatially separated by their first encounter with the dispersive element.

Figure 2A:
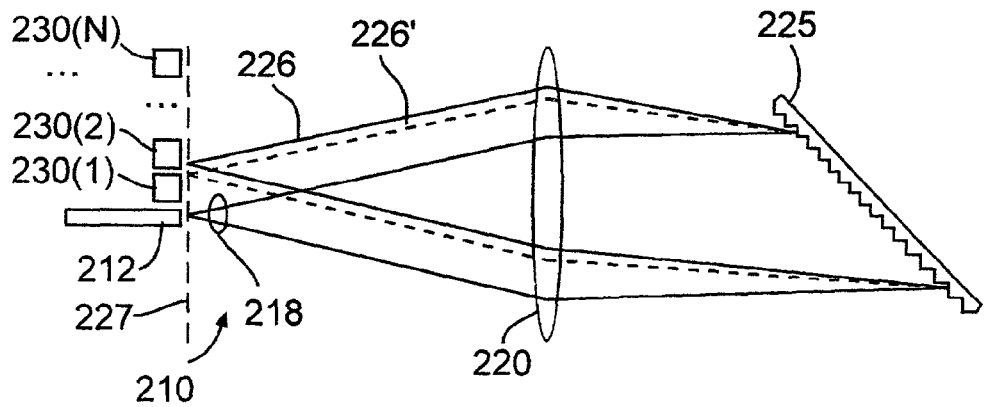
FIGS. 2A, 2B, and 2C are schematic top, side, and end views, respectively, of an optical wavelength routing element used in certain embodiments of the invention.
Figure 2B:
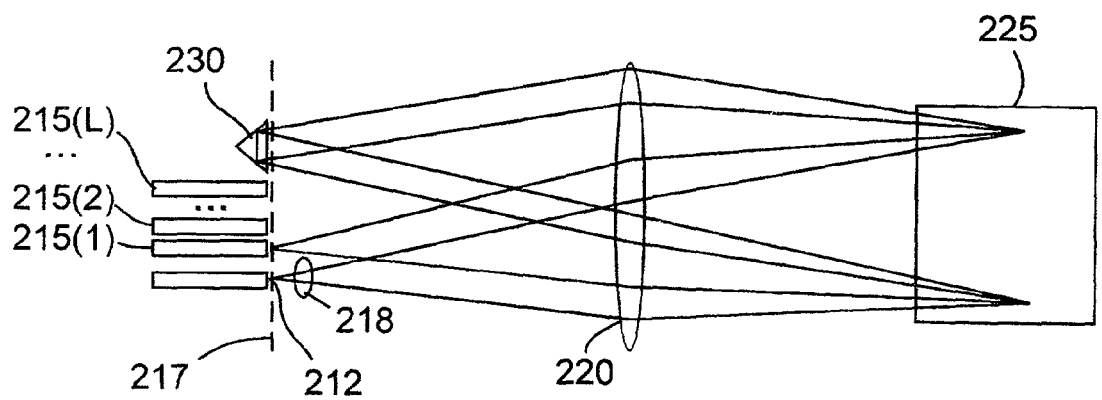
Figure 2C:
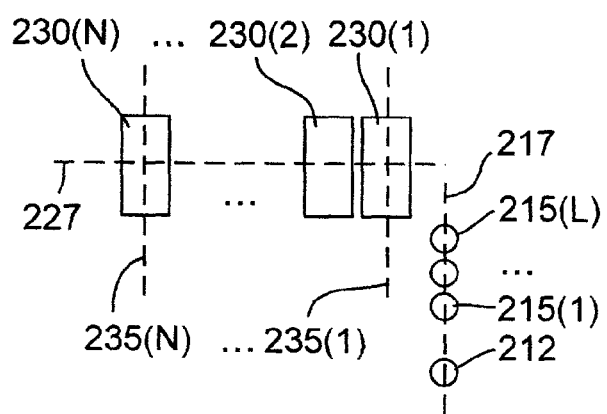

FIGS. 2A, 2B, and 2C are schematic top, side, and end views, respectively, of one embodiment of a 1×L (or, equivalently, L×1) WRE 210. This embodiment may be considered to be a four-pass WRE. Its general functionality is to accept light having a plurality N of spectral bands at a WRE input port 212, and to direct subsets of the spectral bands to desired ones of a plurality L of WRE output ports, designated 215(1) . . . 215(L). The output ports are shown in the end view of FIG. 2C as disposed along a line 217 that extends generally perpendicular to the top view of FIG. 2A. Light entering the WRE 10 from WRE input port 212 forms a diverging beam 218, which includes the different spectral bands. Beam 218 encounters a lens 220 that collimates the light and directs it to a reflective diffraction grating 225. The grating 225 disperses the light so that collimated beams at different wavelengths are directed at different angles back towards the lens 220.

Two such beams are shown explicitly and denoted 226 and 226', the latter drawn in dashed lines. Since these collimated beams encounter the lens 220 at different angles, they are focused towards different points along a line 227 in a transverse plane extending in the plane of the top view of FIG. 2A. The focused beams encounter respective ones of a plurality of retroreflectors, designated 230(1) . . . 230(N), located near the transverse plane. Various examples of micromirror configurations that may be used as part of the retroreflectors, among others, are described in the following copending, commonly assigned applications, each of which is herein incorporated by reference in its entirety for all purposes: U.S. patent application Ser. No. 09/898,988, entitled "SYSTEMS AND METHODS FOR OVERCOMING STICTION USING A LEVER," filed Jul. 3, 2001 by Bevan Staple et al.; U.S. patent application Ser. No. 09/899,000, entitled "FREE-SPACE OPTICAL WAVELENGTH ROUTER BASED ON STEPWISE CONTROLLED TILTING MIRRORS," filed Jul. 3, 2001 by Victor Buzzetta et al.; U.S. patent application Ser. No. 09/899,001, entitled "TWO-DIMENSIONAL FREE-SPACE OPTICAL WAVELENGTH ROUTER BASED ON STEPWISE CONTROLLED TILTING MIRRORS," filed Jul. 3, 2001 by Victor Buzzetta; U.S. patent application Ser. No. 09/899,002, entitled "MEMS-BASED, NONCONTACTING, FREE-SPACED OPTICAL SWITCH," filed Jul. 3, 2001 by Bevan Staple and Richard Roth; U.S. patent application Ser. No. 09/899,004, entitled "BISTABLE MICROMIRROR WITH CONTACTLESS STOPS," filed Jul. 3, 2001 by Lilac Muller; U.S. patent application Ser. No. 09/899,014, entitled "METHODS AND APPARATUS FOR PROVIDING A MULTI-STOP MICROMIRROR," filed Jul. 3, 2001 by David Paul Anderson; and U.S. patent application Ser. No.

09/941,998, entitled "MULTIMIRROR STACK FOR VERTICAL INTEGRATION OF MEMS DEVICES IN TWO-POSITION RETROREFLECTORS," filed Aug. 28, 2001 by Frederick Kent Copeland.

The beams are directed back, as diverging beams, to the lens 220 where they are collimated, and directed again to the grating 225. On the second encounter with the grating 225, the angular separation between the different beams is removed and they are directed back to the lens 220, which focuses them. The retroreflectors 230 may be configured to send their intercepted beams along a reverse path displaced along respective lines 235(1) . . . 235(N) that extend generally parallel to line 217 in the plane of the side view of FIG. 2B and the end view of FIG. 2C, thereby directing each beam to one or another of WRE output ports 215.

Figure 3A:
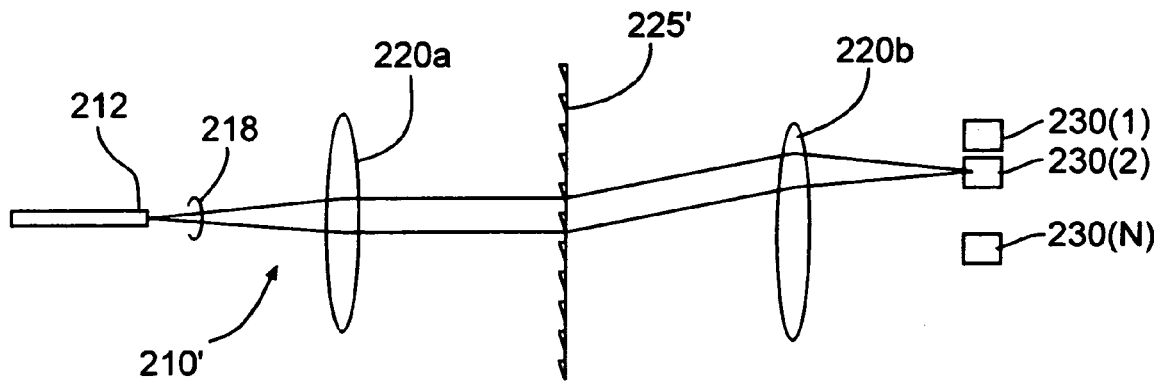
FIGS. 3A and 3B are schematic top and side views, respectively, of an optical wavelength routing element used in certain embodiments of the invention.
Figure 3B:
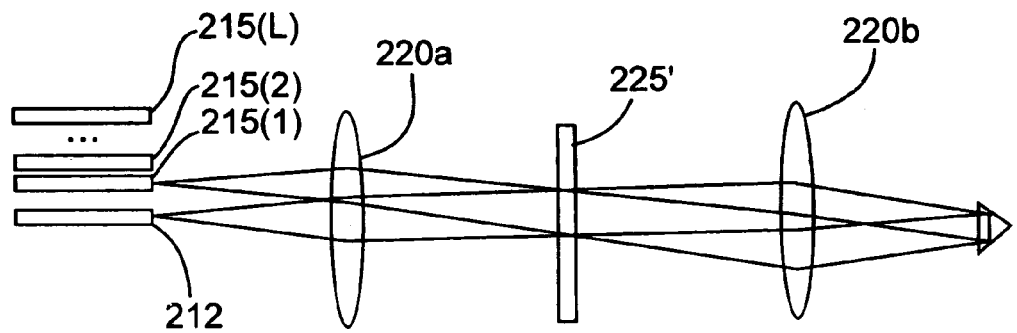

Another embodiment of a WRE, designated 210', is illustrated with schematic top and side views in FIGS. 3A and 3B, respectively. This embodiment may be considered an unfolded version of the embodiment of FIGS. 2A–2C and operates as a two-pass WRE. Light entering the WRE 10' from WRE input port 212 forms diverging beam 218, which includes the different spectral bands. Beam 218 encounters a first lens 220a, which collimates the light and directs it to a transmissive grating 225'. The grating 225' disperses the light so that collimated beams at different wavelengths encounter a second lens 220b, which focuses the beams. The focused beams are reflected by respective ones of plurality of retroreflectors 230, which may also be configured as described above, as diverging beams, back to lens 220b, which collimates them and directs them to grating 225'. On the second encounter, the grating 225' removes the angular separation between the different beams, which are then focused in the plane of WRE output ports 215 by lens 220a.

Figure 4:
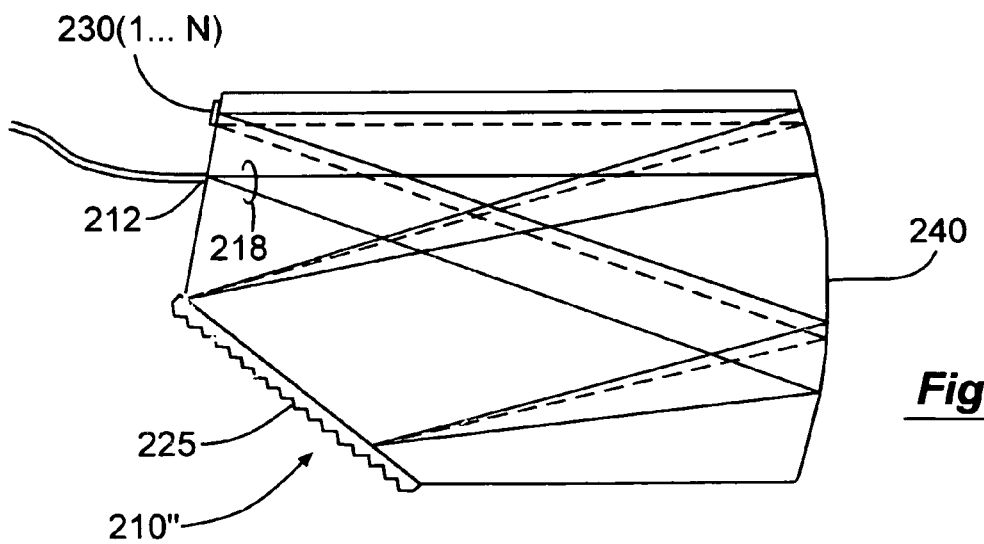
FIG. 4 is a schematic top view of an optical routing element according to a third embodiment of the invention.

A third embodiment of a WRE, designated 210", is illustrated with the schematic top view shown in FIG. 4. This embodiment is a further folded version of the embodiment of FIGS. 2A–2C, shown as a solid glass embodiment that uses a concave reflector 240 in place of lens 220 of FIGS. 2A–2C or lenses 220a and 220b of FIGS. 3A–3B. Light entering the WRE 210" from input port 212 forms diverging beam 218, which includes the different spectral bands. Beam 218 encounters concave reflector 240, which collimates the light and directs it to reflective diffraction grating 225, where it is dispersed so that collimated beams at different wavelengths are directed at different angles back towards concave reflector 240. Two such beams are shown explicitly, one in solid lines and one in dashed lines. The beams then encounter retroreflectors 230 and proceed on a return path, encountering concave reflector 240, reflective grating 225', and concave reflector 240, the final encounter with which focuses the beams to the desired WRE output ports. Again, the retroreflectors 230 may be configured as described above.

3. Cross-Connect Building Blocks

Architectures for large cross connects made in accordance with certain embodiments of the invention use L×1 optical elements that include one or more WREs. Such an element is referred to generically herein as an "L×1 WRE," including arrangements that have more than one WRE, provided at least one WRE is comprised by the element. Thus, one example of an embodiment of an L×1 WRE that may be used in cross-connect architectures according to the invention is a single structure that has one input (output) port and L output (input) ports. Other embodiments of an L×1 WRE comprised of smaller WREs are illustrated in FIGS. 5A–5D.

Figure 5A:
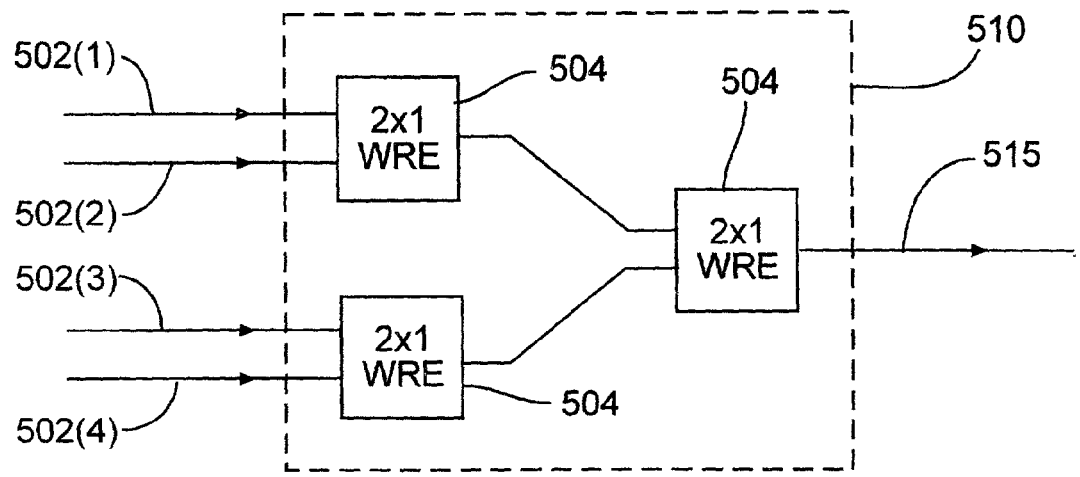
FIGS. 5A–5D are schematic diagrams showing examples of P×1 cross-connect building blocks that include wavelength routing elements in accordance with embodiments of the invention.

For example, FIG. 5A shows how a 4×1 WRE 510 may be configured with three 2×1 WREs. Each of the 2×1 WREs used in any of these embodiments may be configured as one of the WREs described in the '061 application or may be configured according to another WRE design. The 4×1 WRE 510 accepts four input signals 502 and outputs a single output signal 515. The four input signals 502 are received in pairs by two of the 2×1 WREs 504. The outputs from the 2×1 WREs 504 are used as inputs to the third 2×1 WRE, which output the output signal 515.

This arrangement of 2×1 WREs may thus be considered to be a tree arrangement. At each level of the tree, the number of distinct spectral bands across all optical signals at that level is reduced by the action of the 2×1 WREs 504 until, at the final level, only the desired spectral bands remain on the output signal 535. The resulting 4×1 WRE 510 thus functions according to the definition provided above for the operation of a WRE by mapping selected spectral bands from each of the input signals 502 according to a wavelength grid.

The embodiment of FIG. 5A may also be used as a 1×4 WRE to perform the reverse mapping according to the wavelength grid by interchanging the functions of the input and output ports. In such an instance, spectral bands originating on the single input signal are progressively directed to the desired ones of the plurality of output signals by separating them with the 2×1 WREs 504 at each level of the tree. It is thus evident for a 1×4 WRE (and more generally for a 1×L WRE) that certain wavelength-grid positions of at least some of the output signals will be inactive by carrying no spectral bands.

Figure 5B:
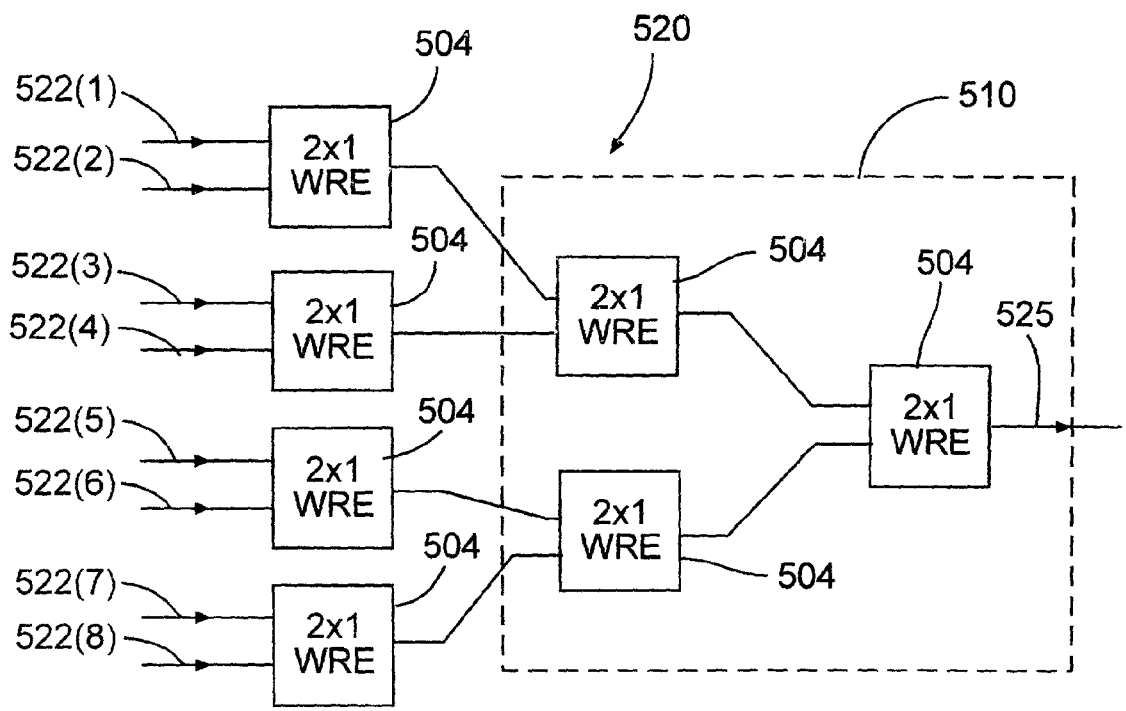

FIG. 5B shows an extension of the tree arrangement of 2×1 WREs 504 to an architecture that provides an 8×1 WRE 520. Spectral bands from eight input signals 522 are routed according to a unique wavelength-grid assignment to a single output signal 525. The eight input signals 522 are received in pairs by four 2×1 WREs 504, and the four outputs from those 2×1 WREs are received by the 4×1 WRE 510 shown in FIG. 5A. The resulting 8×1 WRE 520 functions according to the definition provided above for the operation of a WRE by mapping selected spectral bands from each of the input signals 522 according to a wavelength grid. It may also be used as a 1×8 WRE to perform the reverse mapping according to the wavelength grid by interchanging the functions of the input and output ports.

It is evident that larger WREs may be configured by including more layers in the tree. Adding still another layer of 2×1 WREs to the 8×1 WRE of FIG. 5B results in a 16×1 WRE. More generally, for a tree having p full layers of 2×1 WREs, the resulting element functions as a $2^p \times 1$ WRE, mapping spectral bands from $2^p$ input signals according to a wavelength grid onto a single output port. Such an element may alternatively be used as a $1 \times 2^p$ WRE to perform the reverse mapping according to the wavelength grid by interchanging the functions of the input and output ports.

Figure 5C:
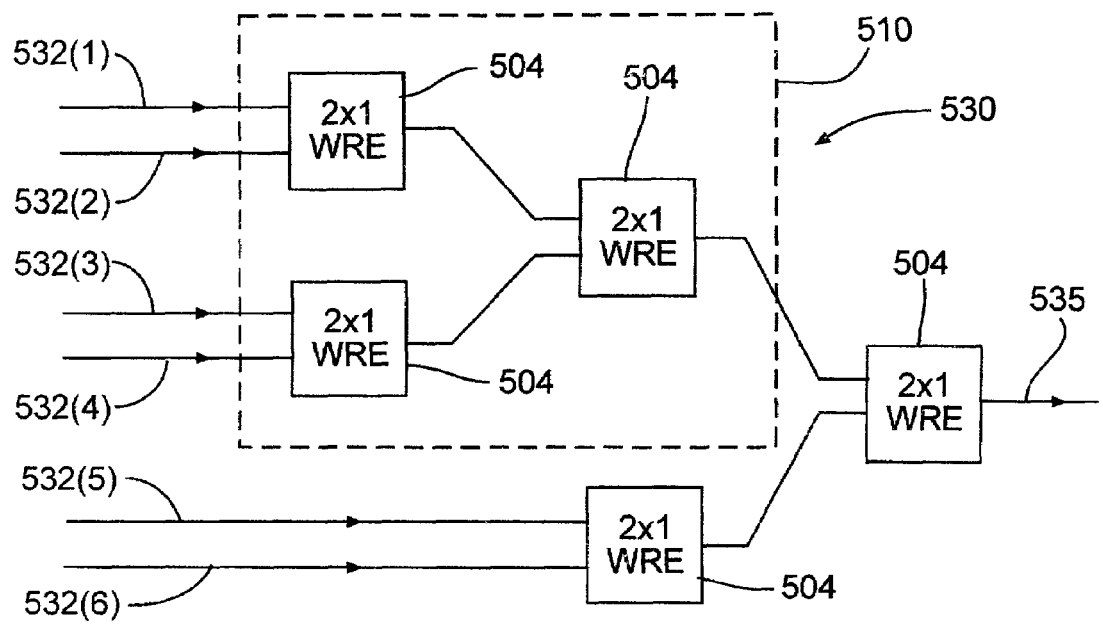

It is not necessary that every level of the tree be completely filled with 2×1 WREs. For example, FIG. 5C provides a schematic illustration of an embodiment similar to that of FIG. 5B except that two of the 2×1 WREs 504 at the widest level of the tree have been removed. Accordingly, this embodiment functions as a 6×1 WRE 530 that maps selected spectral bands from each of six input signals 532 according to a wavelength grid onto a single output signal 535. Interchanging the functions of input and ports results in a reverse mapping according to the wavelength grid so that element 530 functions as a 1×6 WRE. It is noted by showing the component 4×1 WRE 510 with the dashed line that this embodiment may alternatively be considered as a configuration having a complete tree, but with different sizes of WREs on a given level. The 6×1 WRE 530 shown comprises a tree having a 4×1 WRE 510 and a 2×1 WRE 504 on its widest level, these WREs feeding into a 2×1 WRE 504 at the top level.

Figure 5D:
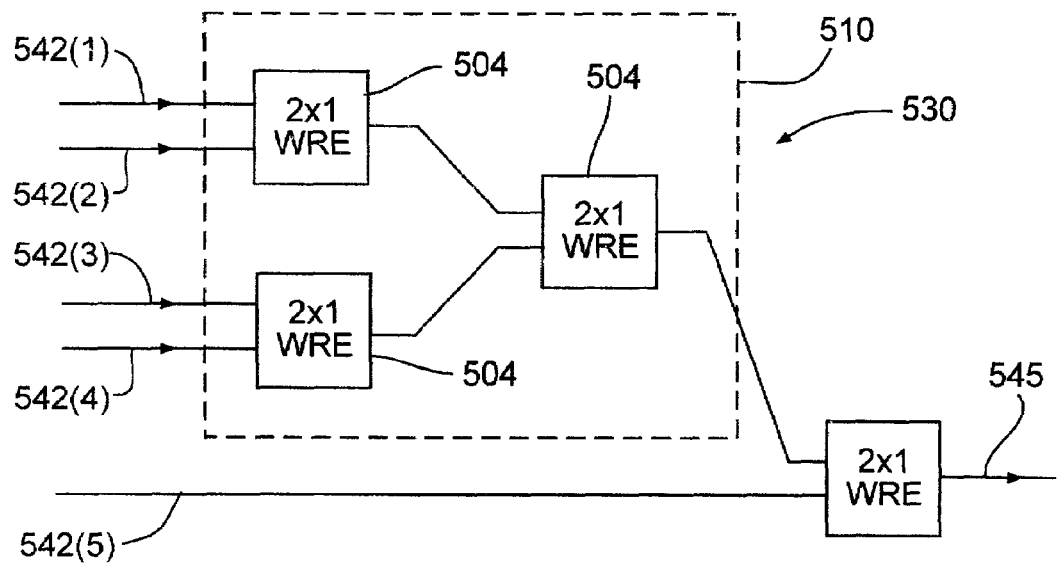

Similarly, FIG. 5D eliminates some 2×1 WREs 504 from two levels of the tree when compared with FIG. 5B. The illustrated embodiment functions as a 5×1 WRE 540 by mapping selected spectral bands from each of five input signals 542 according to a wavelength grid onto a single output signal 545. As for the other embodiments, element 540 may function as a 1×5 WRE by interchanging the functions of the input and output ports. Also, like the embodiment shown in FIG. 5C, element 540 may be considered as having WREs of different sizes, specifically in this example of comprising a 4×1 WRE 510 and a 2×1 WRE 504.

It is evident that various other combinations may be made according to the principles described with respect to FIGS. 5A–5D to produce L×1 and 1×L WREs for any value of L.

Figure 6A:
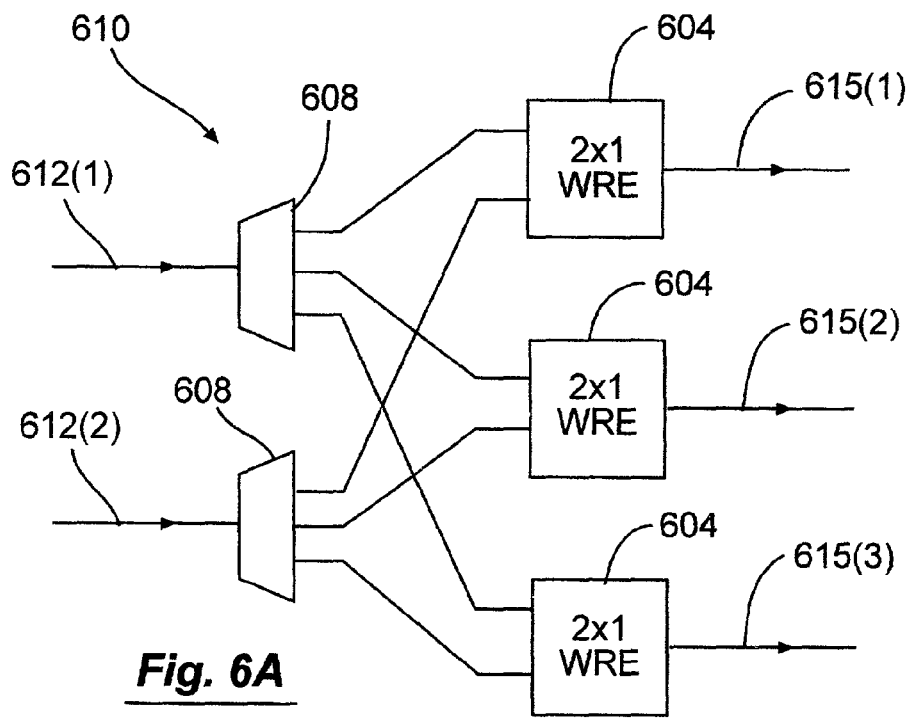
FIGS. 6A and 6B are schematic diagrams showing examples of 2×3 and 3×2 cross-connect building blocks that include wavelength routing elements in accordance with embodiments of the invention.
Figure 6B:
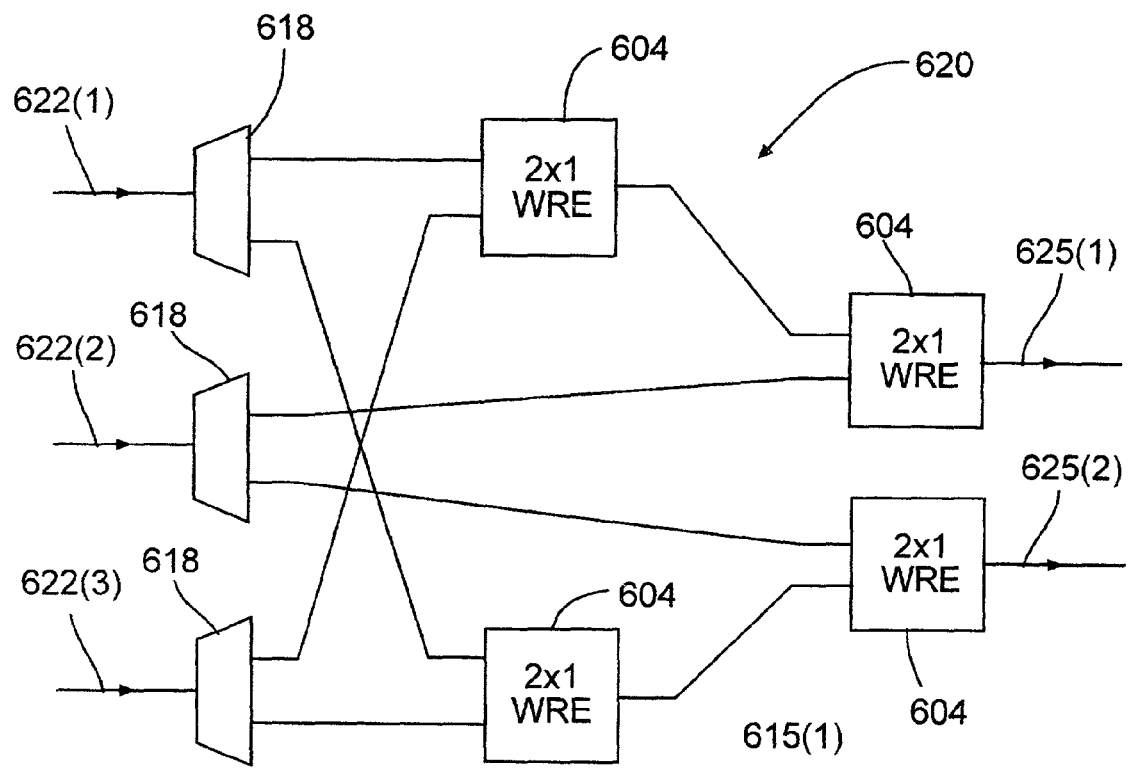

FIGS. 6A and 6B provide examples respectively of 2×3 and 3×2 cross-connect building blocks. The illustrated embodiments use combinations of 2×1 WREs, which may be configured as described in the '061 application or otherwise, and optical splitters. The embodiment shown in FIG. 6A functions as a 2×3 cross connect that maps spectral bands from two input optical signals 612 according to a wavelength grid onto three output signals 615. Each of the input optical signals 612 encounters a 1:3 optical splitter 608 connected with three 2×1 WREs 604. This arrangement thus provides a duplicate of both input signals 612 to each of the 2×1 WREs 604, each of which is configured to select the desired spectral bands for its corresponding output signal 615. Notably, this arrangement permits any combination of the spectral bands available from either of the input signals 612 to be included on any of the output signals 615, subject to the constraint imposed be the wavelength grid. Thus, for example, the specific spectral band at $\lambda_0$ on the wavelength grid for, say, the first input signals 612(1), may be included on one, two, or even all three of the output signals depending on the configuration of the 2×1 WREs 604. It is even possible for all of the output signals 615 to include an identical set of selected spectral bands from the two input signals 612.

FIG. 6B provides an example of a 3×2 cross-connect building block that operates on similar principles. Each of the three input signals 622 encounters a 1:2 optical splitter which directs duplicates of the input signals according to the arrangement illustrated in the figure. The routing of the duplicates with the illustrated set of 2×1 WREs permits each of the output signals 625 to include any desired combination of spectral bands from the input signals 622, subject to the wavelength-grid constraint and depending on the states of the 2×1 WREs. As for the arrangement shown in FIG. 6A for a 2×3 cross-connect building block, a specific spectral band from any of the input signals may be included on any (or all) of the output signals if desired.

4. K×K Optical Wavelength Cross Connects a. Broadcast-and-Select Optical Wavelength Cross Connects The building-block architectures illustrated in FIGS. 6A and 6B are examples of a more general class of cross-connect architectures described herein as "broadcast-and-select architectures." A common feature of such architectures is that the input optical signals are duplicated with optical splitters, with a duplicate of each of the input signals being provided to a WRE, which may then be configured to select any of the desired spectral bands. There is therefore no constraint prohibiting a specific spectral band from any of the input signals from appearing on whatever number of output signals is desired. Such a capacity may be especially suitable for certain applications, including video applications among others.

1. High-Reliability Embodiments

Figure 7A:
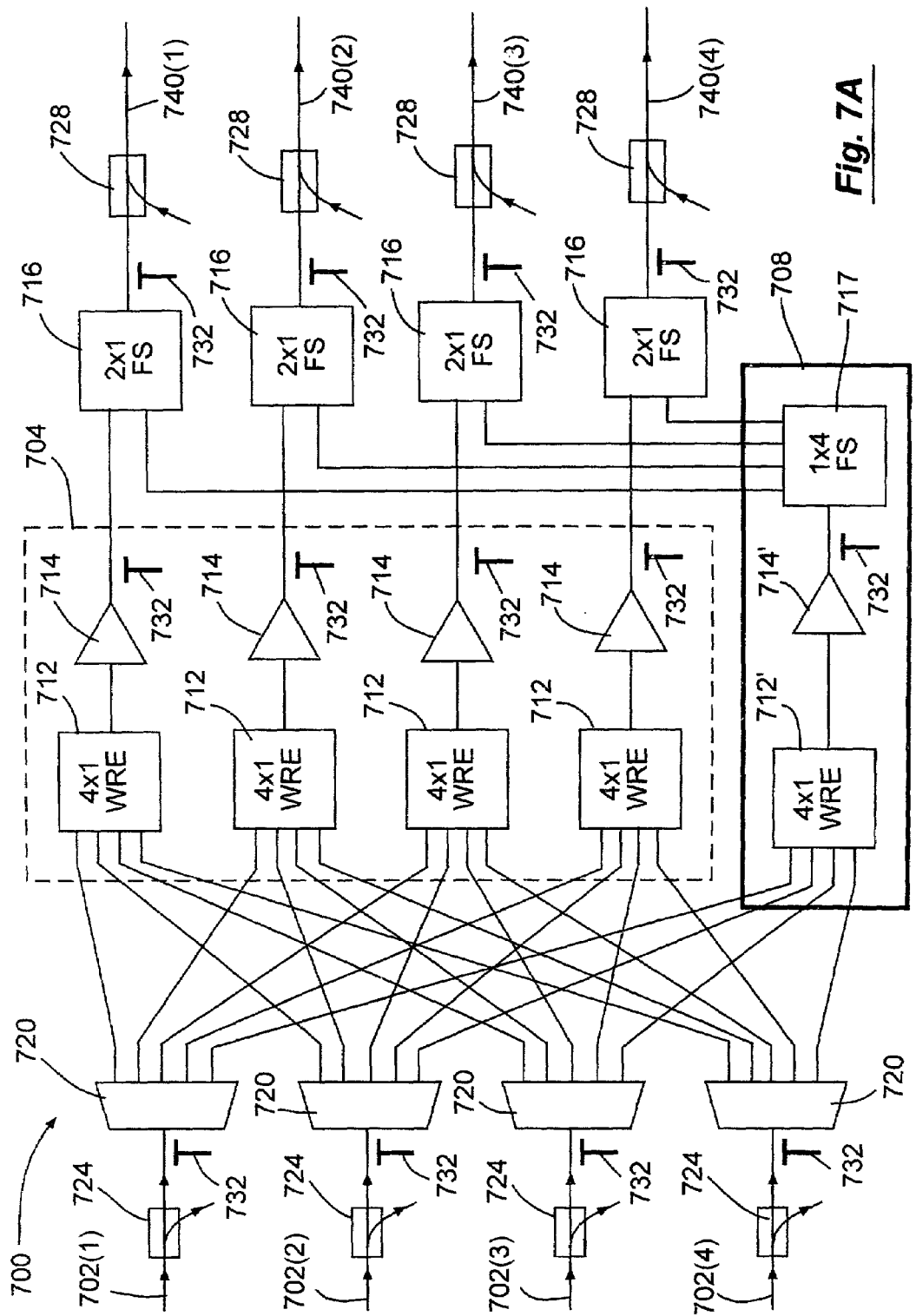
FIGS. 7A and 7B are schematic diagrams showing optical wavelength cross-connect architectures using a broadcast-and-select arrangement according to embodiments of the invention.

The broadcast-and-select architectures may be equipped with a protection capability. An example of such an architecture for a 4×4 cross connect 700 is illustrated in FIG. 7A, although it is evident how the principles may be used for a K×K cross connect of any size. In FIG. 7A, the cross connect comprises working fabric, denoted 704, and protection fabric, denoted 708. The working fabric includes a number K of K×1 WREs 712, each of which is configured to receive a duplicate of each of the input signals 702. In a manner similar to that described with respect to FIG. 6A, each of the K×1 WREs 712 may be configured to select whichever spectral bands are desired for the corresponding output signals 740.

The protection fabric 708 also includes a K×1 WRE 712' configured to receive a duplicate of each of the input signals 702. In the event of a failure in the system affecting the output from one of the WREs 712 included on the working fabric 704, the protection WRE 712' may be configured to substitute for the WRE 712 affected by the failure. Such substitution is accomplished with an arrangement of fiber switches. First, the protection fabric 708 comprises a 1×K fiber switch that receives the output of the protection WRE 712' and directs it to one of K fiber switches provided as 2×1 fiber switches 716. Each of these 2×1 fiber switches 716 may select between a signal received from an associated WRE 712 on the working fabric and a signal from the 1×K fiber switch on the protection fabric, i.e. corresponding to a signal from the protection WRE.

Thus, in normal operation, each of the 2×1 fiber switches 716 is configured to transmit the optical signals received from their respective WREs 712 comprised by the working fabric 704 as output signals 740. In the event of a failure affecting one of the working WREs 712, transmission of the otherwise affected output signal 740 is preserved by using the protection fabric: the protection WRE 712' is configured to reproduce the signal otherwise produced by the affected working WRE 712; the 1×4 fiber switch comprised by the working fabric 708 is configured to transmit that signal to the 2×1 fiber switch 716 corresponding to the affected working WRE 712; and that 2×1 fiber switch 716 is configured to transmit the signal from the protection path, i.e. from the 1×4 fiber switch 717, rather than the signal from the working path.

Duplicates of the input signals 702 are provided to all of the 4×1 WREs by 1:5 optical splitters 720 configured to encounter each of the input signals 702 and directing their outputs to the WREs. More generally, with a broadcast-and-select configuration for a K×K cross connect having a single protection WRE, the optical splitters used will be 1:(K+1) splitters. The strength of the duplicate signals will be reduced as a result of the power splitting performed by the splitters 720. Accordingly, optical amplifiers 714 and 714' are provided on the working and protection fabrics 704 and 708 to strengthen the output signals 740. In the illustrated embodiment, the optical amplifiers 714 and 714' are positioned respectively after the working and protection WREs 712 and 712' along the optical paths followed by the optical signals, although other positions within the cross-connect architecture may alternatively be used. In one embodiment, the optical amplifiers 714 and 714' comprise erbium-doped fiber amplifiers ("EDFAs").

Further optional components of the cross connect 700 include a plurality of optical performance monitors ("OPMs") 732. The OPMs act as low-power taps into the optical paths that may be used for monitoring the optical channels. Such OPMs 732 are shown in the illustrated embodiment positioned in three distinct positions along the optical paths: before the optical splitters 720; after the optical amplifiers 714 on both the working and protection fabrics 704 and 708; and after the 2×1 fiber switches 716. Each of these locations may be used for different monitoring purposes. The OPMs 732 positioned before the optical splitters 720 permit identification of signal faults before the active operation of the cross connect so that corrective action may be taken. Similarly, the OPMs 732 positioned after the 2×1 fiber switches 716 may be used to ensure no signal faults propagate along the output signals 740. Including OPMs 732 on the working and protection fabrics 704 and 708 provides signal monitoring that permits isolation of each of the WREs 712 and 712' in diagnosing the source of any faults that may be detected. Such flexibility is particularly useful in some instances, including during the performance of an in-service upgrade as described below.

Optical supervisory channel ("OSC") components may also optionally be included on the input and output signals. Such components are useful in instances where the input signal 702 includes out-of-band signals, i.e. includes additional spectral bands distinct from the wavelength grid used by the WREs. An OSC drop 724 may thus be included on each of the input signals 702 to detect and remove any such out-of-band signals. The out-of-band signals may then be added back to the output signals 740 with OSC adds 728 on the output signals.

2. Ultrahigh-Reliability Embodiments

The reliability of the K×K cross connect may be increased by several orders of magnitude by including an additional WRE on the protection fabric. This is illustrated for an 8×8 cross connect 750 in FIG. 7B. The basic operation of the cross connect 750 is the same as the cross connect 700 described with respect to FIG. 7A. Working fabric 754 includes eight 8×1 WREs 762 configured to receive duplicates of input signals 752 from optical splitters 770. The optical splitters 770 are 1:10 splitters to accommodate the eight WREs 762 comprised be the working fabric and two WREs 762' comprised by the protection fabric 758. Each of the signals output by the working WREs 762 encounters a 3×1 fiber switch 766 that receives signals from its associated working WRE 762 and may also receive signals from two 1×8 fiber switches 767 included on the protection fabric 758 and optically connected with each of the protection WREs 762'. The 3×1 fiber switches 766 transmit the appropriate signal as output signal 790. Amplifiers 764 and 764' may be included as shown on the working and protection fabrics 754 and 758 to accommodate the power losses from the optical splitters 770, or may be positioned elsewhere in other embodiments. OPMs 782 may also be provided to monitor the performance of optical signals at different points in the cross-connect architecture, including on the working and protection fabrics 754 and 758 in some embodiments. OSC drops 774 and adds 778 may be provided for removing out-of-band signals from the input signals 752 and including them on the output signals 790.

Figure 7B:
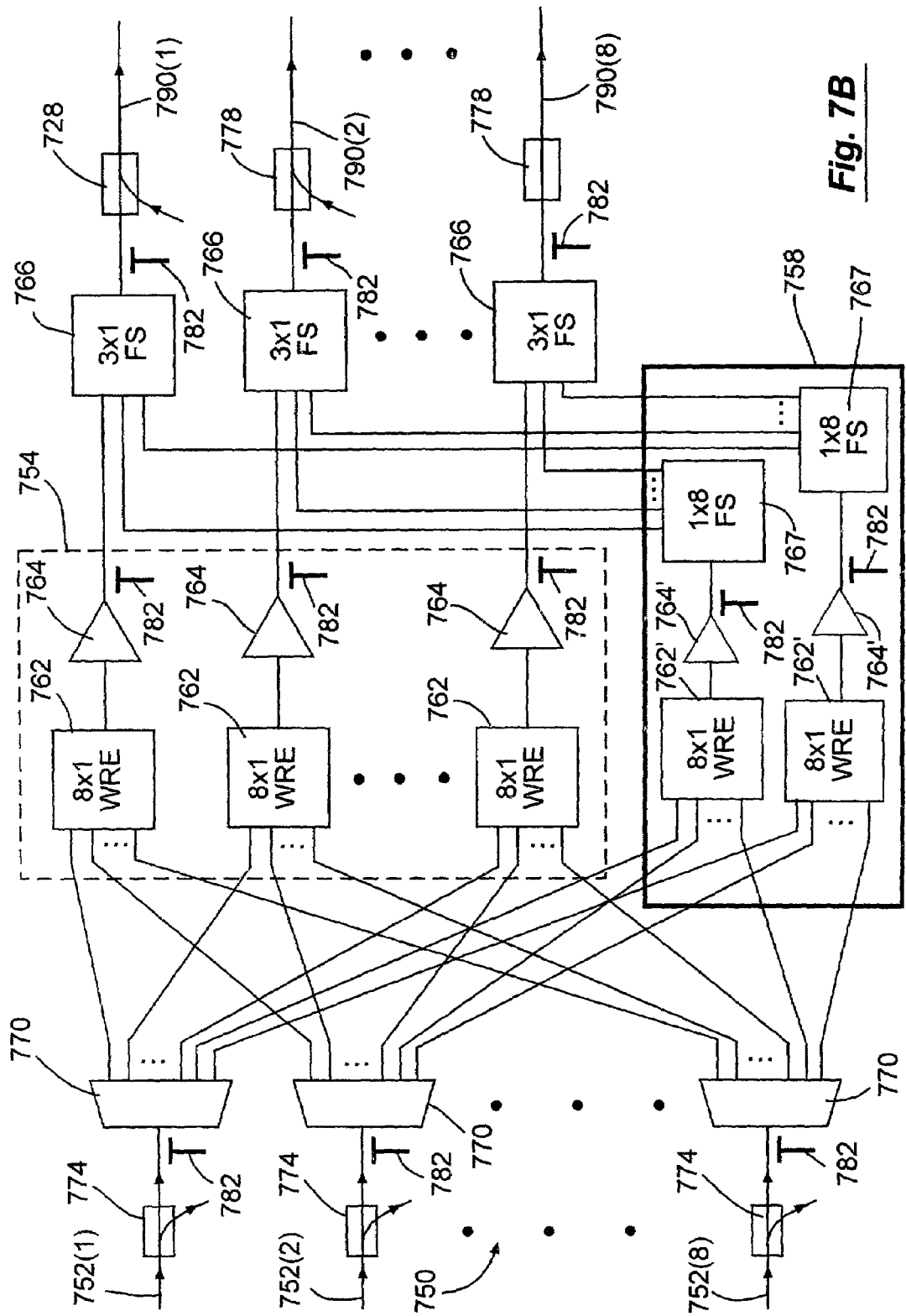

Operation of the 8×8 cross connect shown in FIG. 7B is substantially the same as operation of the 4×4 cross connect shown in FIG. 7A. The large overall increase in reliability afforded by the two protection WREs 762' may be understood by noting that there is statistically a mean time to failure for any element comprised by the cross connect. In the event of a failure, traffic is rerouted to one of the protection WREs 762' for at a time period corresponding to a mean time to repair the failure. During that repair-time window, there is a small but finite probability of a second failure, which may be protected by routing traffic to the second protection WRE 762'. It is even possible to accommodate the very remote possibility of certain types of third failures under some circumstances where the working path suffered only a partial failure. Traffic from the third failure, if consistent with the maintained operation of the partially failed path, may be rerouted to the partially failed path.

It is evident from the description of FIGS. 7A and 7B how to arrange a K×K cross-connect architecture having F protection paths. Each of K WREs included on the working fabric and F WREs included on the protection fabric comprises a K×1 WRE. A total of K optical splitters are thus provided as 1:(K+F) splitters. The fiber switches provided on the protection fabric are 1×K fiber switches and the fiber switches transmitting the output signals are (F+1)×1 fiber switches.

3. In-Service Upgrades

The broadcast-and-select architectures described with respect to FIGS. 7A and 7B permit an existing $K_{i_1} \times K_{j_1}$ architecture to be upgraded to a $K_{i_2} \times K_{j_2}$ architecture without disrupting traffic using the cross connect. The illustration below focuses on the the special case of symmetric cross connects where $K_{i_1} = K_{j_1}$ and $K_{i_2} = K_{j_2}$, but such a limitation is not necessary and the upgrade may be performed more generally on asymmetric cross connects. The method for performing such an upgrade is shown schematically for the general case with the flow diagram of FIG. 8A and is shown at sequential stages in FIGS. 8B–8G for the specific case of upgrading a 2×2 cross connect ($K_{i_1} = K_{j_1} = 2$) having a single protection path to a 4×4 cross connect ($K_{i_2} = K_{j_2} = 4$). The following description thus refers simultaneously to the general method of FIG. 8A and the specific example in FIGS. 8B–8G. For convenience of description, the example of FIGS. 8B–8G omits OSC components, amplifiers, and OPMs, although it is understood that such components may be included in the architecture in different embodiments.

Figure 8A:
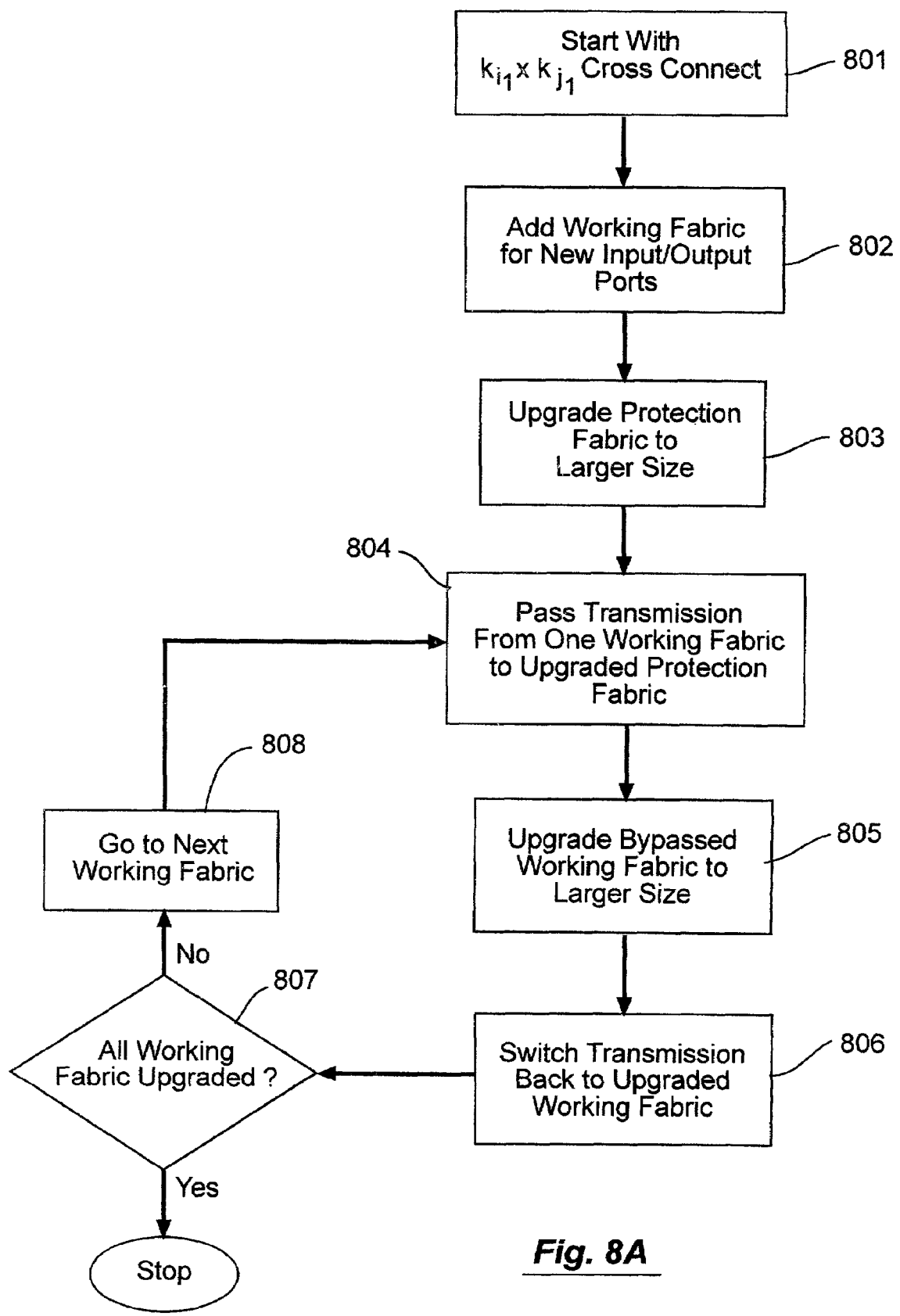
FIG. 8A is a flow diagram showing a method for performing an in-service upgrade of an optical wavelength cross-connect in accordance with an embodiment of the invention.
Figure 8B:
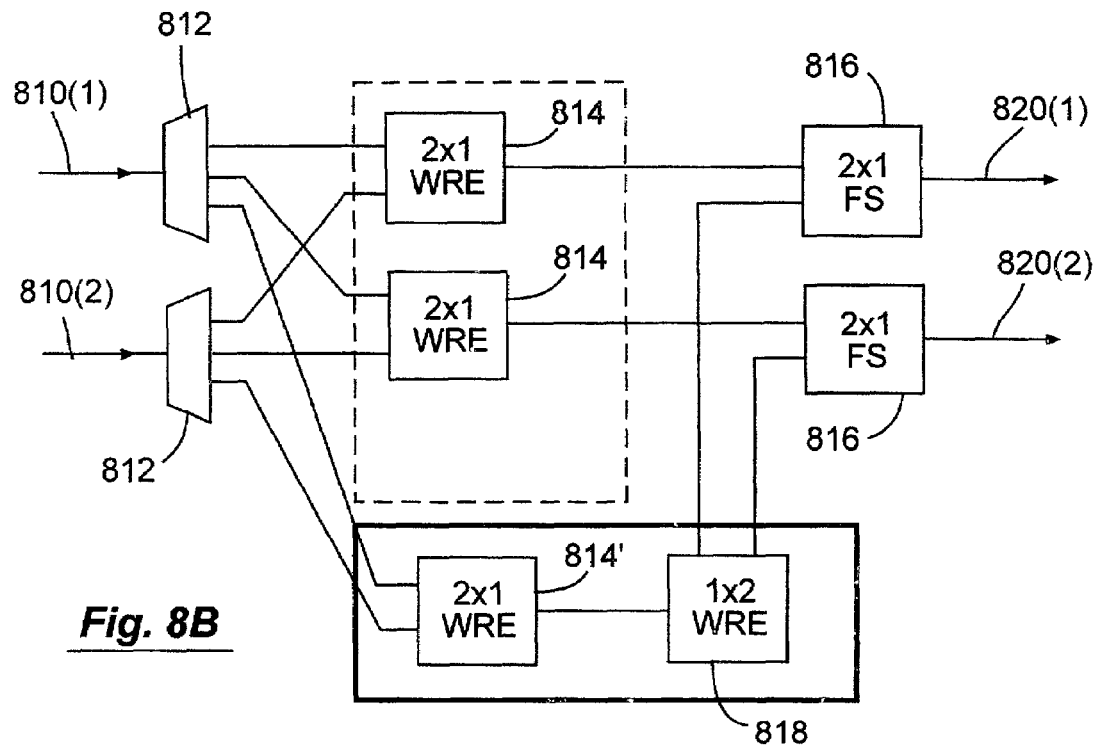
FIGS. 8B–8G are schematic diagrams illustrating the configuration of an optical wavelength cross-connect at different stages of an in-service upgrade performed in accordance with the flow diagram of FIG. 8A.
Figure 8C:
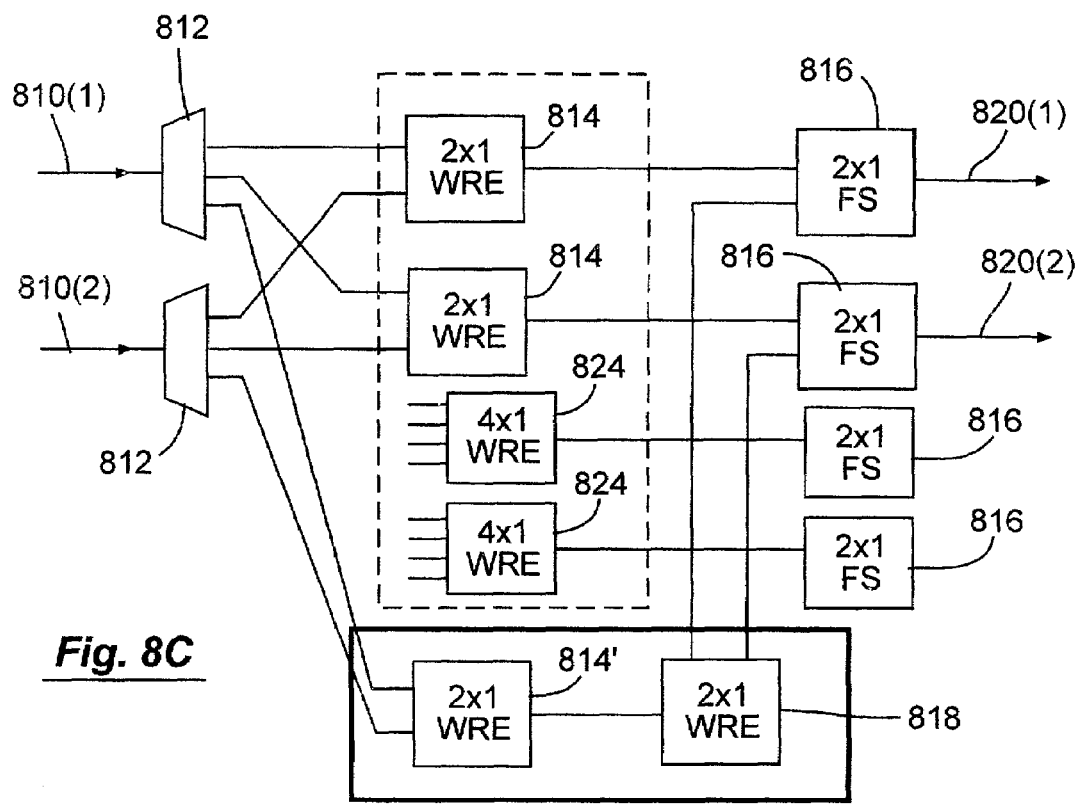

At block 801 of FIG. 8A, the method begins with a $K_{i_1} \times K_{j_1}$ cross connect such as the 2×2 cross connect shown in FIG. 8B. The 2×2 cross connect includes two 2×1 WREs on the working fabric and a 2×1 WRE 814' optically connected with a 1×2 fiber switch 818 on the protection fabric. Optical splitters 812 encounter the input signals 810 to direct duplicates to the WREs 814 and 814'. The output signals 820 are emitted from 2×1 fiber switches 816 configured to transmit working or protection signals depending on the configuration of the cross connect.

At block 802 of FIG. 8A, new working fabric is added to the cross-connect architecture to accommodate the new input and output ports. In upgrading the exemplary 2×2 cross connect to a 4×4 cross connect, the WREs on the working and protection fabrics will be replaced with 4×1 WREs. Thus in FIG. 8C, the cross connect is shown with two 4×1 WREs 824 added to the working fabric and optically connected with two new 2×1 fiber switches 816 that will be used to transmit new output signals.

Figure 8D:
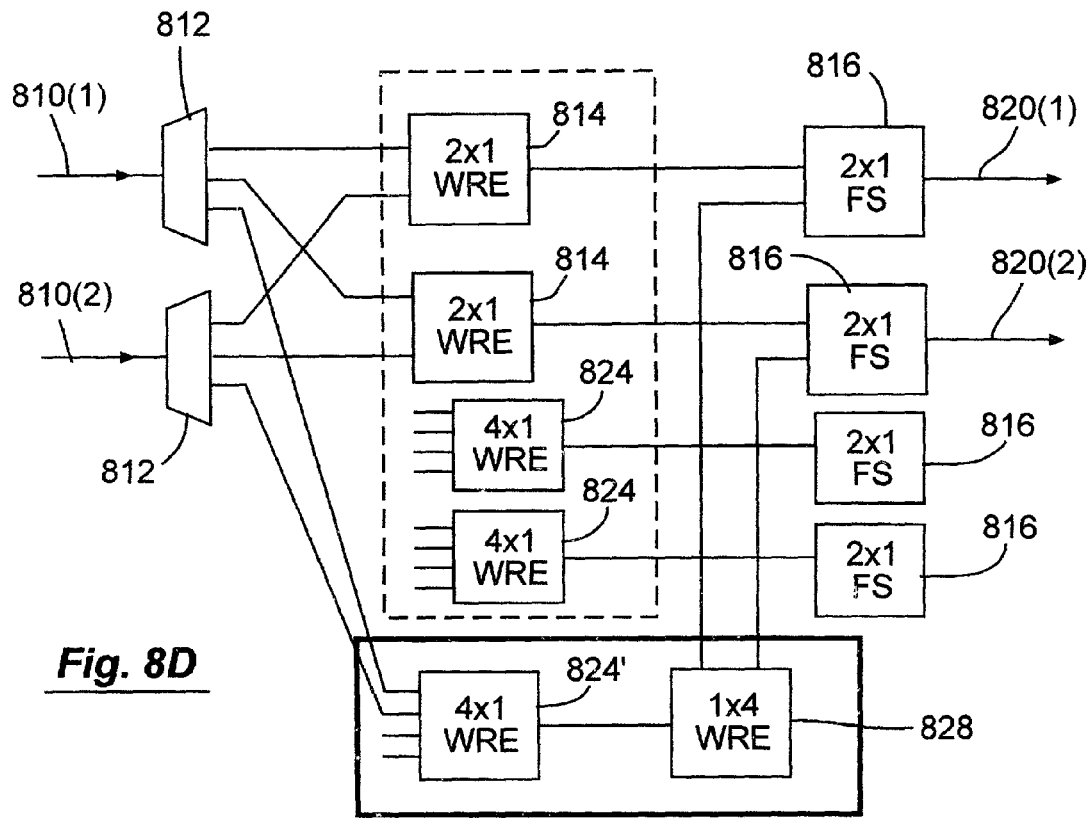

At block 803 of FIG. 8A, the protection fabric is upgraded to the larger size. Thus, as shown in FIG. 8D for the exemplary upgrade to a 4×4 cross connect, the 2×1 WRE 814' and 1×2 fiber switch 818 are replaced with a 4×1 WRE 824' and a 1×4 fiber switch 828 respectively. Optical connections between the resulting protection fabric and other optical components of the system are completed. It is noted that such a four-channel protection fabric is capable of protecting traffic input from any number of input signals 810 up to four, including in particular the two input signals 810 being maintained during the upgrade. Also, while FIG. 8D illustrates simply upgrading the existing protection fabric to a larger size, in other embodiments the protection fabric is further upgraded by adding one or more additional protection paths with additional WREs and fiber switches, producing a protection fabric similar to that described with respect to FIG. 7B.

At this point in the method, each component of the working fabric is upgraded sequentially by transferring the traffic that uses that component of the working fabric to the protection fabric and performing the upgrade of that component. This is illustrated with a loop in the flow diagram of FIG. 8A, with traffic from the first component being transferred to the protection fabric at the first encounter of block 804. After upgrading the bypassed component of the working fabric at block 805, the cross connect appears as in FIG. 8E, with the first 2×1 WRE 814 substituted with a 4×1 WRE 824.

Figure 8E:
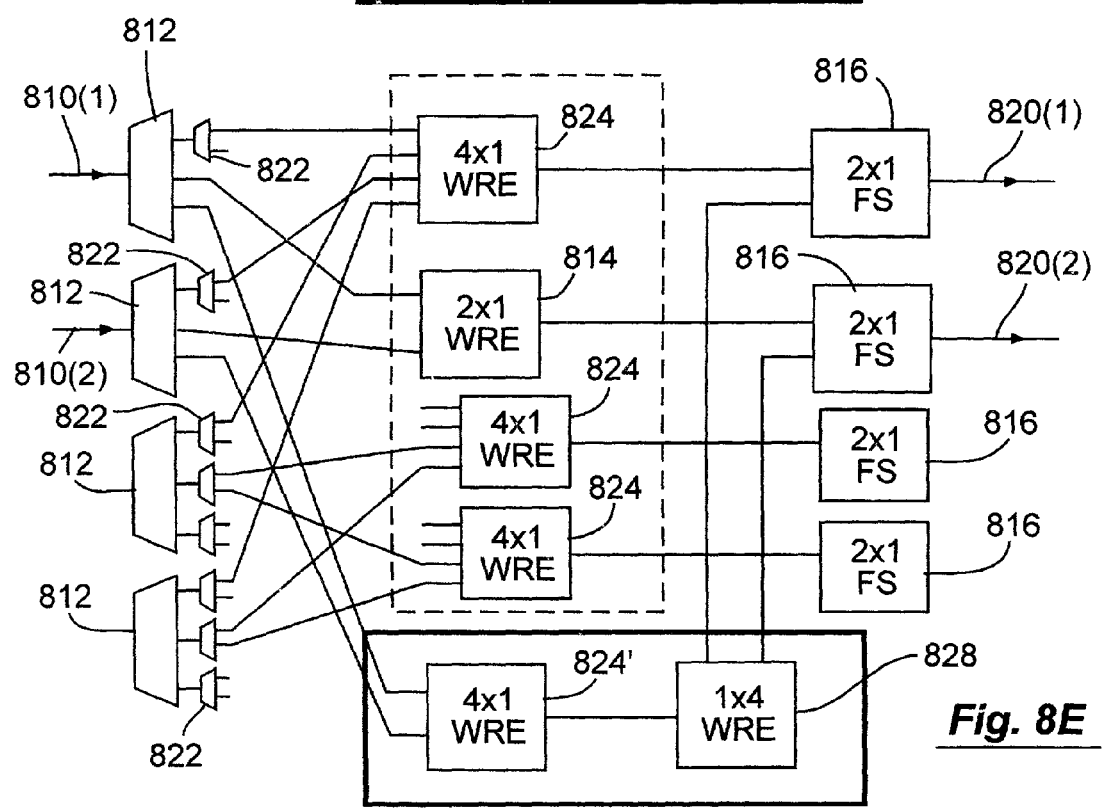

In addition, FIG. 8E illustrates how the operation of the optical splitters may be extended by adding 1:2 optical splitters as necessary at the outputs of the existing optical splitters. Such 1:2 optical splitters are added at points in the process when those outputs are not actively in use. Thus, in FIG. 8E 1:2 optical splitters 822 are added to the first outputs of the 1:3 splitters 812 while the traffic for the first input signal 810(1) is routed to the protection traffic. Optical connections are also made between the upgraded working WRE 824 and the (new) first outputs of the effectively expanded optical splitters. Optical splitters to be configured for encountering the new traffic to be added to the finally upgraded cross connect may be similarly configured as a combination of 1:3 and 1:2 splitters as shown. Alternatively, 1:5 splitters may be substituted. In the event that an additional protection channel is to be added, 1:6 splitters may be used instead to accommodate it.

Figure 8F:
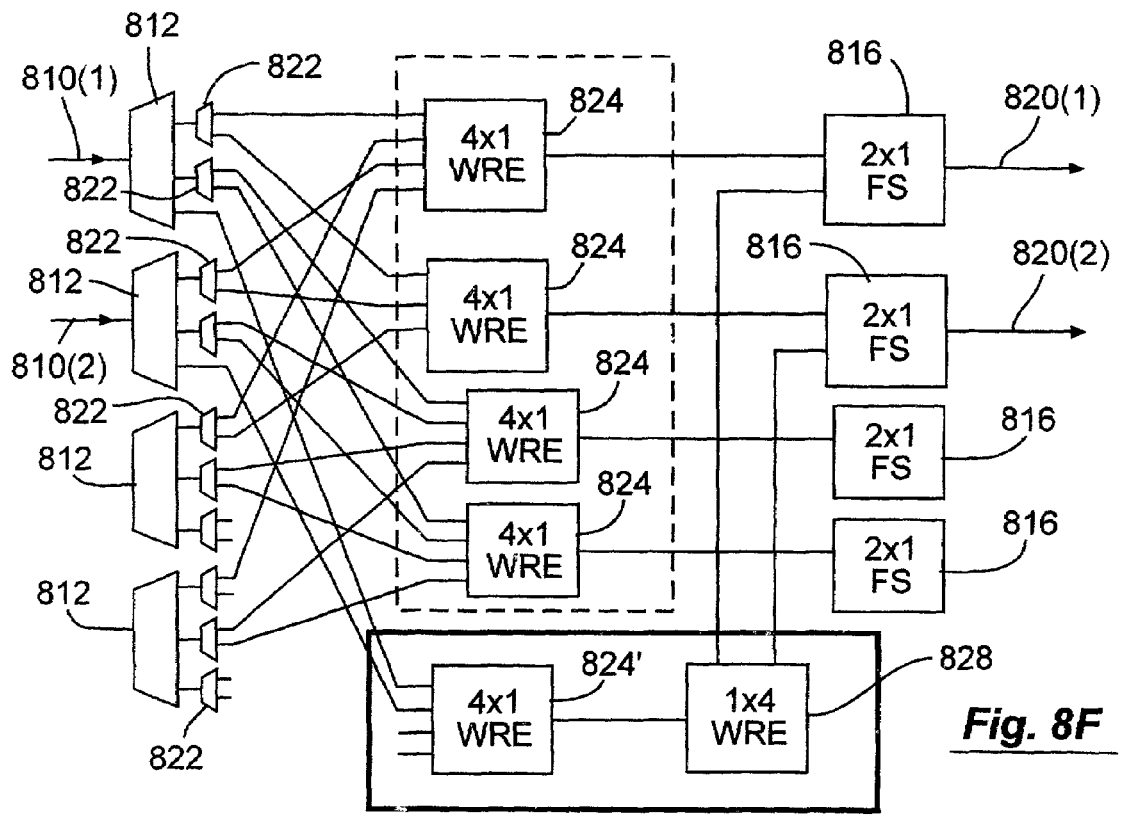

After upgrading the bypassed component of the working fabric, the transmission of the bypassed traffic is switched back to the upgraded working fabric at block 806 of FIG. 8A. A determination is made at block 807 whether all of the working fabric has been upgraded. If not, the next component of the working fabric is upgraded at block 808 with the cycle repeating until the entire working fabric has been upgraded. Thus, FIG. 8F shows a further intermediate illustration of the cross connect when the traffic for the second input signal 810(2) is bypassed to the protection fabric. A similar upgrade is performed on the second component of the working fiber from a 2×1 WRE 814 to a 4×1 WRE 824 while the traffic is bypassed. Also, the 1:2 optical splitters 822 are added to the second outputs of the 1:3 optical splitters 812 and optically connected with the new 4×1 WRE 824.

Figure 8G:
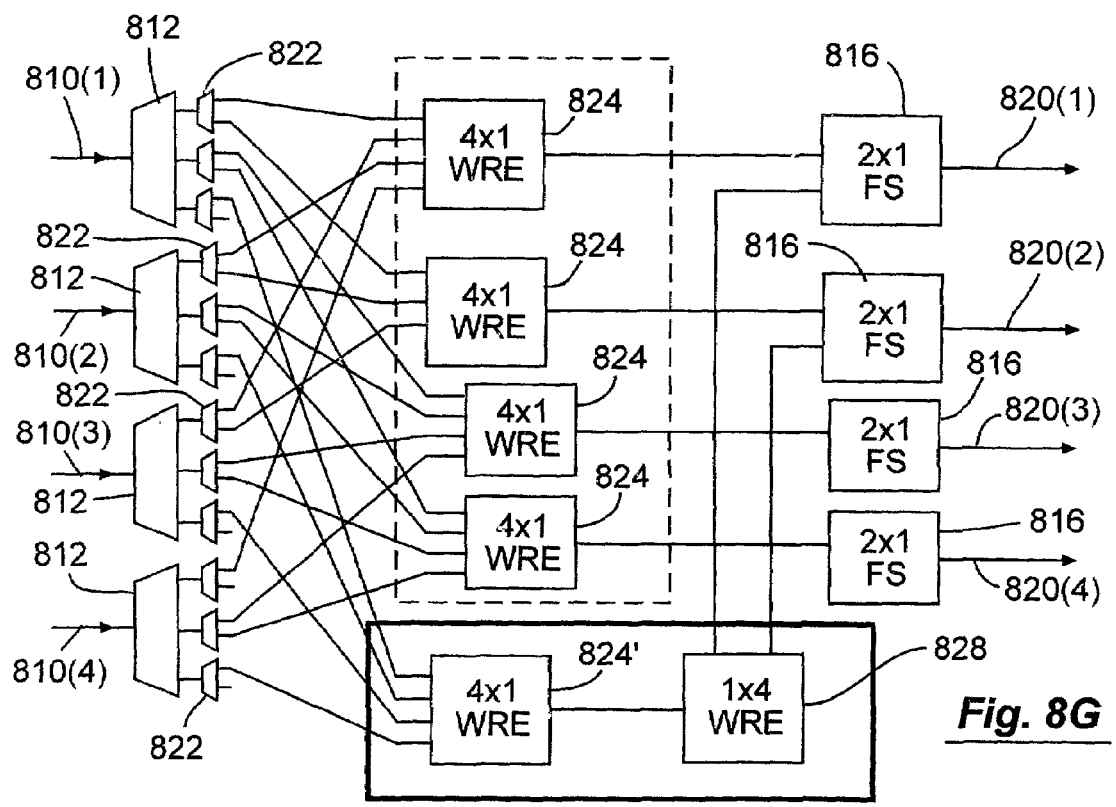

After all the working fabric has been upgraded, additional optical signals 810(3) and 810(4) may be provided to, and additional output signals 820(3) and 820(4) emitted from, the cross connect, as shown in FIG. 8G. The cross connect now functions in every respect as a 4×4 broadcast-and-select cross-connect architecture. As shown in FIG. 8G, the third output of all the 1:3 optical splitters 812 is connected with a 1:2 optical splitter 822, resulting in an unused output. As alluded to above, the unused outputs may be optically connected with a second protection WRE on the protection fabric. Furthermore, for an architecture that uses only a single protection WRE, it is unnecessary to include the 1:2 optical splitters 822 on the third outputs of the 1:3 optical splitters 812 to include all optical connections with the working and protection fabrics; they are therefore omitted in an alternative embodiment. It is also noted that if the original K×K cross connect includes two protection paths, one of the protection paths may still function operationally as a protection path during the upgrade while the other protection path is used as a bypass while upgrading the working fabric.

It is noted that while FIGS. 8A and 8B–8G illustrate one embodiment for an in-service upgrade in which the protection fabric is upgraded before the working fabric is upgraded, such an order is not necessary. More generally, the upgrade of the protection fabric may more be performed at any point in the method, i.e. before, after, or even during the upgrade of the working fabric. With respect to the flow diagram of FIG. 8A, the position of block 803 may thus be freely moved within the method without exceeding the scope of the invention.

b. Distribute-and-Select Optical Wavelength Cross Connects

Figure 9A:
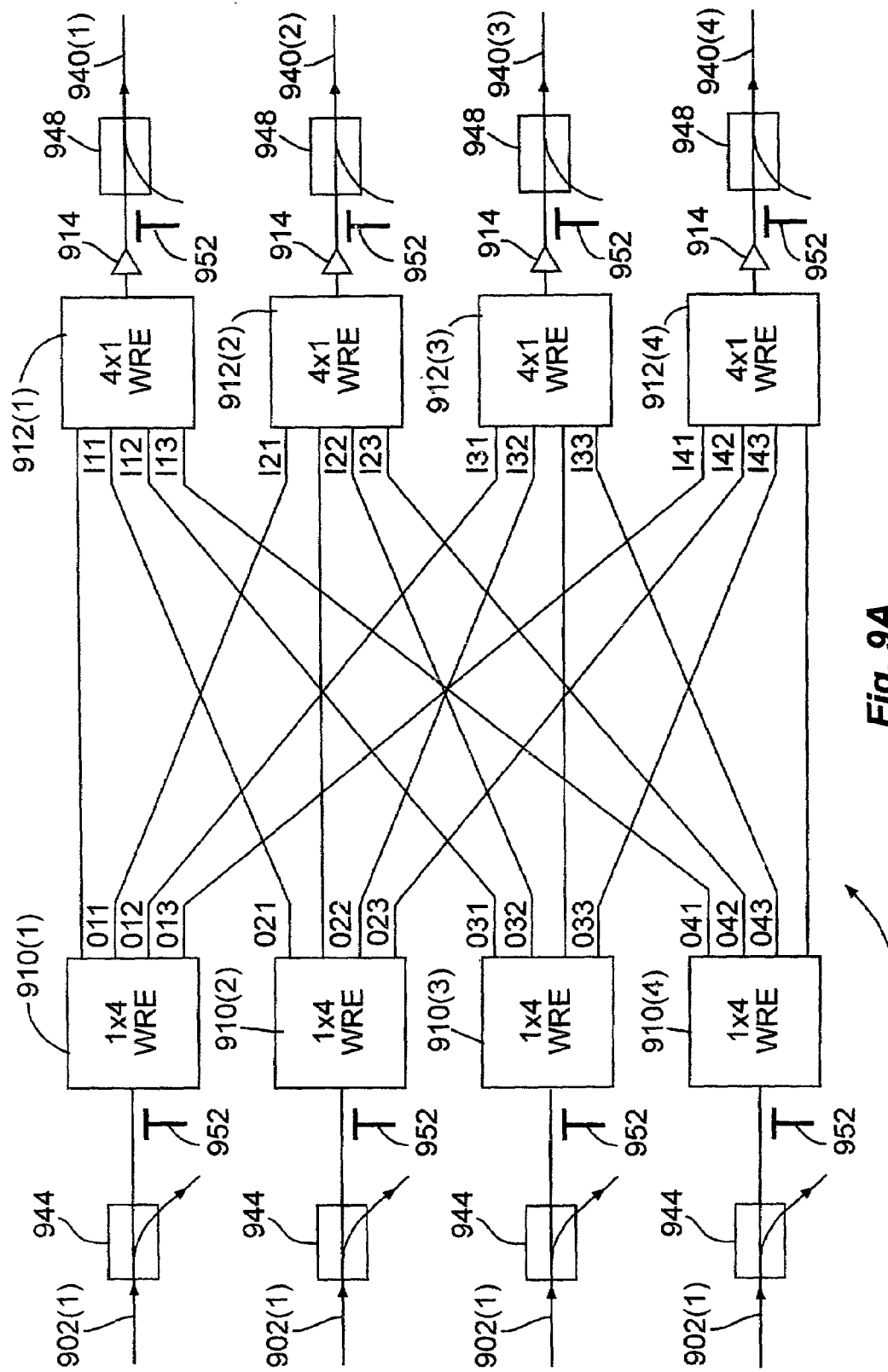
FIGS. 9A and 9B are schematic diagrams showing optical wavelength cross-connect architectures using a distribute-and-select arrangement according to embodiments of the invention.

In alternative embodiments, the optical wavelength cross connect is configured as a distribute-and-select cross connect. Illustrations of a 4×4 cross connect configured in this way are provided in FIGS. 9A and 9B and correspond in functionality to the 4×4 broadcast-and-select cross connect shown schematically in FIG. 7A. To illustrate the basic operation of the distribute-and-select architecture, FIG. 9A provides an example of a configuration without protection. The working fabric in the distribute-and-select cross connect 900 includes a set of 1×4 WREs 910 and a set of 4×1 WREs 912. In the illustrated embodiment, each of the 1×4 WREs 910 receives one of the input signals 902.

The four outputs of each 1×4 WRE 910 are connected to an input port for each of the four 4×1 WREs 912. In normal operation, each of the 1×4 WREs 910 acts to distribute the spectral bands from its associated input signal 902 to the particular 4×1 WREs 912 that correspond to the desired output signal 940 for those spectral bands. Each of the 4×1 WREs 912 thus receives the spectral bands to be included on its associated output signal 940 and acts to multiplex those spectral bands accordingly.

This distribute-and-select architecture may be supplemented by additional features in a manner similar to that described with respect to the broadcast-and-select architecture. For example, amplifiers 914 may be included to compensate for loss of signal strength as optical signals are propagated through the system. In one embodiment the amplifiers 914 comprise erbium-doped fiber amplifiers. The amplifiers 914 may be positioned as shown in the embodiment of FIG. 9A, directly after the 4×1 WREs 912 along the optical paths followed in the cross connect, or may be positioned at other points in the system in other embodiments.

The cross connect 900 may also comprise OPMs 952 positioned at various points in the cross connect 900 to act as low-power taps for monitoring the optical channels. Such OPMs 952 are shown in the illustrated embodiment positioned in before each of the 1×4 WREs 910 and after the amplifiers 914 that follow the 4×1 WREs 912, although other positions may be used alternatively. The OPMs 952 permit isolated signal monitoring of the WREs in diagnosing the source of any faults that may be detected.

In addition, OSC drops 944 and adds 948 may be provided respectively on the input and output signals 902 and 940 for removing and adding out-of-band signals.

Figure 9B:
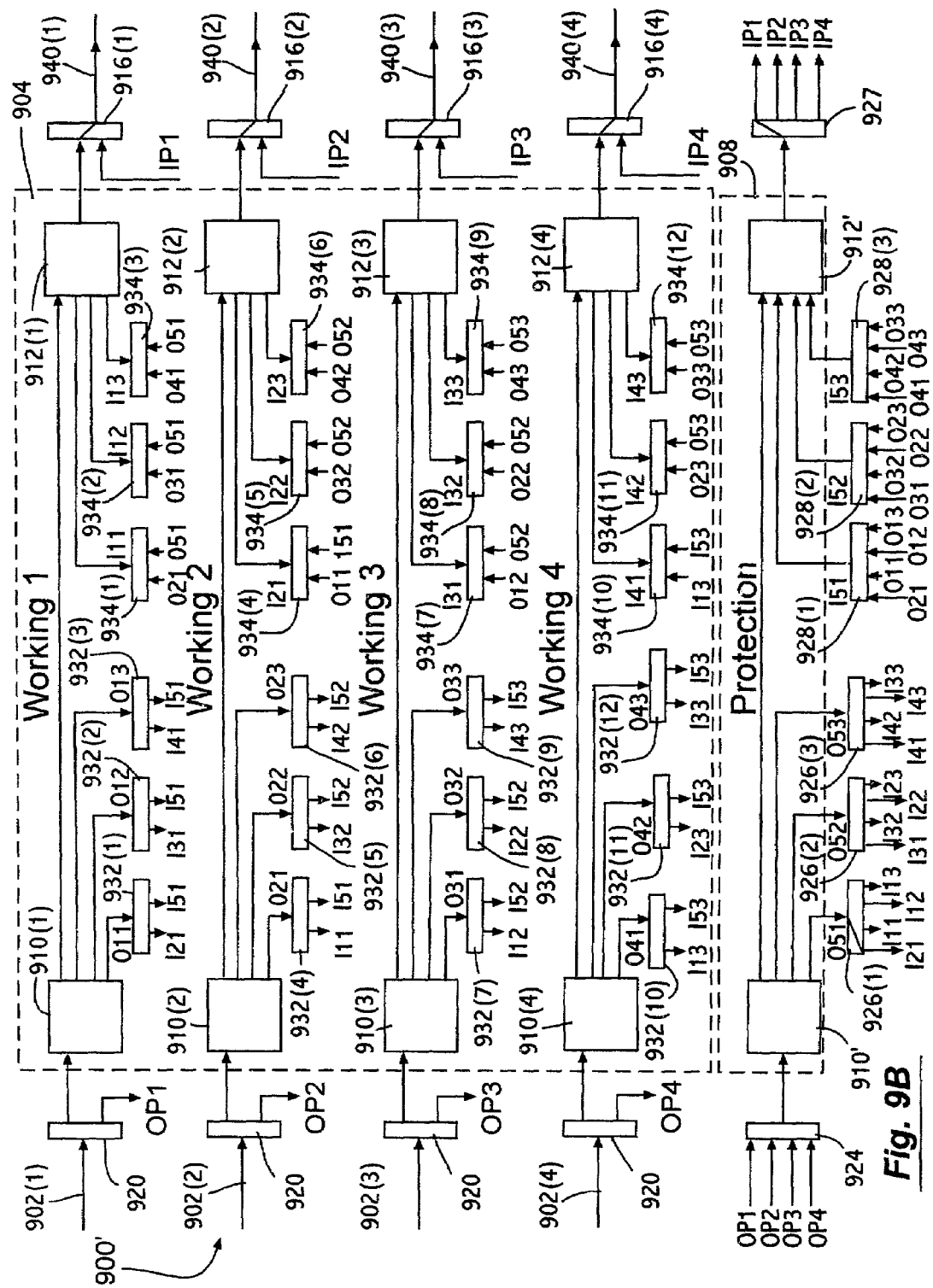

In some embodiments, the distribute-and-select architecture may include a protection fabric, such as illustrated in FIG. 9B. The operation of the protection-fabric embodiment shown in FIG. 9B may be explained more simply by labeling optical signals internal to the cross connect. This is done illustratively in FIG. 9A, in which internal optical signals emanating from the 1×4 WREs 910 are labeled Oαβ and internal optical signals received by the 4×1 WREs 912 are labeled Iβ'α'. Signals that are directed from the kth 1×4 WRE 910(k) to the kth 4×1 WRE 912(k) are unlabeled. For each of the other "O" signals emanating from the 1×4 WREs 910, α defines the originating 1×4 WRE 910(α) and β defines the receiving 4×1 WRE 912; because the labeling convention limits β to 1, 2, or 3, the same value of β may be used in different Oαβ labels to refer to different receiving 4×1 WREs 912. Similarly, for each of the other "I" signals received at the 4×1 WREs 912, α' defines the originating 1×4 WRE 910 and β' defines the receiving 4×1 WRE 912(β'); because the labeling convention limits α' to 1, 2, or 3, the same value of α' may be used in different Iβ'α' labels to refer to different originating 1×4 WREs 910.

This labeling convention for internal signals is also used in FIG. 9B, in which the 4×4 distribute-and-select cross connect 900' includes a protection fabric 908. The working fabric is denoted 904 and has a general functionality that corresponds to that described with respect to FIG. 9A. Rather than receive the input signals 902 directly, however, splitters 920 are disposed to intercept each of the input signals 902, sending an equivalent of each to both the working fabric 904 and the protection fabric 908. For input signal 902(k), the equivalent signal directed to the protection fabric is denoted OPk. Similarly, 2×1 fiber switches 916 are provided to select signals from either the working fabric 904 or the protection fabric 908 and to direct the selected signals as output signals 940. The signal received from the protection fabric 908 and corresponding to output signal 940(k) is denoted IPk.

Associated with each 1×4 WRE 910 on the working fabric 904 are 1×2 fiber switches 932 that may be configured to direct an optical signal received from the 1×4 WRE 910 either to elsewhere on the working fabric 904 or to the protection fabric 908. Similarly, associated with each 4×1 WRE 912 on the working fabric 904 are 2×1 fiber switches 934 that may be configured to direct an optical signal received either from elsewhere on the working fabric 904 or from the protection fabric 908 to the 4×1 WRE 912.

As shown in FIG. 9B, the protection fabric 908 includes a 1×4 WRE 910' and a 4×1 WRE 912' configured similarly to the corresponding elements comprised by the working fabric 904. A selection of the equivalent optical signals OPk directed to the 1×4 WRE 910' is determined by a state of a 4×1 fiber switch 924 disposed to intercept the equivalent optical signals OPk. Similarly, a 1×4 fiber switch 927 is disposed to determine how to direct the signal propagated by the 4×1 WRE 912' onto signals IPk. Associated with the 1×4 WRE 910' are 1×4 fiber switches 926 that may be configured to redirect signals from the 1×4 WRE 910' to different points in the working fabric 904. Associated with the 4×1 WRE 912' are 4×1 fiber switches 928 that may be configured to direct signals from the working fabric to the 4×1 WRE 912'.

As in FIG. 9A, the internal optical signals on both the working and protection fabrics 904 and 908 are conventionally labeled Oαβ for signals emanating from the 1×4 WREs 910 and 910', and Iβ'α' for signals directed to the 4×1 WREs 912 and 912'. The same conventional notation is used as in FIG. 9A, with the WREs 910' and 912' on the protection fabric 908 being denoted as the fifth WREs so that O5β and I5α' refer to optical signals internal to the protection fabric 908. The propagation of the internal optical signals to effect the operation of the cross connect is determined by the states of the 1×2 fiber switches 932, the 2×1 fiber switches 934, the 1×4 fiber switches 926, and the 4×1 fiber switches 928. For example, with the configuration of such switches as shown in FIG. 9B, the cross connect 900' does not use the protection fabric and operates identically to the cross connect 900 as shown in FIG. 9A. For example, in both FIGS. 9A and 9B, from the first 1×4 WRE 910(1), signal O11 is directed to signal I21, signal O12 is directed to signal I31, signal O13 is directed to signal I41, and the unlabeled signal is directed directly to the 4×1 WRE 912(1). Similarly, in both FIGS. 9A and 9B, to the first 4×1 WRE 912(1), signal I11 is received from signal O21, signal I12 is received from signal O31, signal I13 is received from signal O41, and the unlabeled signal is received directly from the 1×4 WRE 910(1). It can be readily verified that all of the other internal working signals in the figures correspond.

In the event of a failure, traffic may be protected by changing the configuration of certain fiber switches and selecting the appropriate configurations for the protection WREs 910' and 912'. For example, in the event of a failure of one of the first WREs 910(1) or 912(1), traffic that would use those WREs 910(1) and 912(1) may be rerouted to the protection fabric. This is done by: (1) setting the 1×4 fiber switch 924 to OP1 so that traffic otherwise directed to the first working 1×4 WRE 910(1) is instead directed to the protection 1×4 WRE 910'; (2) setting the 4×1 fiber switch 927 to IP1 and the 2×1 fiber switch 916(1) to IP1 so that traffic otherwise received from the first working 4×1 WRE 912(1) is instead received from the protection 4×1 WRE 912'; and (3) setting fiber switches 926, 928, 932, and 934 so that the O5β signals will be directed as would otherwise be the O1β signals and that the I5α' signals will be received as would otherwise be the I1α' signals. Specifically, (3) is achieved by: setting fiber switch 932(4) to direct O21 to I51; setting fiber switch 934(4) to direct O51 to I21; setting fiber switch 932(7) to direct O31 to I52; setting fiber switch 934(7) to direct O52 to I31; setting fiber switch 932(10) to direct O41 to I53; setting fiber switch 934(10) to direct O53 to I41; setting fiber switch 926(1) to direct O51 to I21; setting fiber switch 926(2) to direct O52 to I31; setting fiber switch 926(3) to direct O53 to I41; setting fiber switch 928(1) to direct O21 to I51; setting fiber switch 928(2) to direct O31 to I52; setting fiber switch 928(3) to direct O41 to I53; and leaving the settings of the other fiber switches 932 and 934 as they are for working traffic. Similar settings may be used in the event it is necessary to reroute traffic to respond to a failure in a different part of the working fabric 904.

While not shown explicitly in FIG. 9B, the distribute-and-select architecture with protection may also include amplifiers on the working and/or protection fabrics. Such amplifiers may be disposed as desired to compensate for loss of signal strength as optical signals are propagated through the system. In particular, such losses may be greater with the protection fabric as shown in FIG. 9B than those in FIG. 9A because of the power splitting introduced by the optical splitters 920. Also, while not explicitly shown, OPMs may additionally be included at various points in the cross connect to monitor the optical channels. Suitable positions include, among others: before the optical splitters 920 to identify signal faults before active operation of the cross connect 900'; after optical amplifiers positioned on the working and/or protection fabrics 904 and 908 to permit isolated signal monitoring of the WREs in diagnosing the source of detected faults; and after the 2×1 fiber switches 916 to permit identification of signal faults after active operation of the cross connect 900'. Additionally, OSC drops and adds may be provided respectively on the input and output signals 902 and 940 for removing and adding out-of-band signals.

It is evident that the basic architecture shown for a 4×4 cross connect in FIG. 9B may be extended to an arbitrary K×K cross connect that receives K input signals and emits K output signals and has F protection arrangements. The working fabric comprises a first set of K WREs each configured to operate as a 1×K WRE and a second set of K WREs each configured to operate as a K×1 WRE. The protection fabric comprises F similar pairs of 1×K WREs and K×1 WREs. A set of K optical splitters are disposed to be encountered by the input signals, each comprising a 1:(F+1) optical splitter and the K fiber switches transmitting the output signals comprise (F+1)×1 fiber switches. Each of the 1×2 fiber switches 932 is substituted with a 1×(F+1) fiber switch to redirect traffic to any of the protection arrangements and each of the 2×1 fiber switches 934 is substituted with an (F+1)×1 fiber switch to receive traffic from any of the protection arrangements. The fiber switches 926 and 928 associated with each protection arrangement are provided respectively as 1×K and K×1 fiber switches so that each protection arrangement may interchange traffic with any of the working components as necessary.

One advantage of the distribute-and-select architecture is that component failures are readily detected with a simple power detector placed on the output. This ability results from the fact that a failure can only act to remove a desired spectral band from one of the output signals, but cannot act to substitute the desired spectral band with an undesired spectral band. As an example, consider the failure of a single retroreflector in one of the WREs comprised by the working fabric. That failure will be manifested on the output signals as an absence of a desired spectral band. A further advantage to the distribute-and-select architecture is that the power splitting of the input signals is modest, even for very large cross connects, since they are used only to provide duplicate signals as needed for the protection fabric.

c. Other Cross-Connect Architectures

Other cross-connect architectures that use at least one WRE are also within the scope of the invention. A number of such alternative architectures are provided below as illustrations of specific embodiments, but it will be appreciated that these illustrations are not intended to be limiting and that there are various other alternative embodiments that are also within the scope of the invention.

1. Crossbar Cross Connects

Figure 10A:
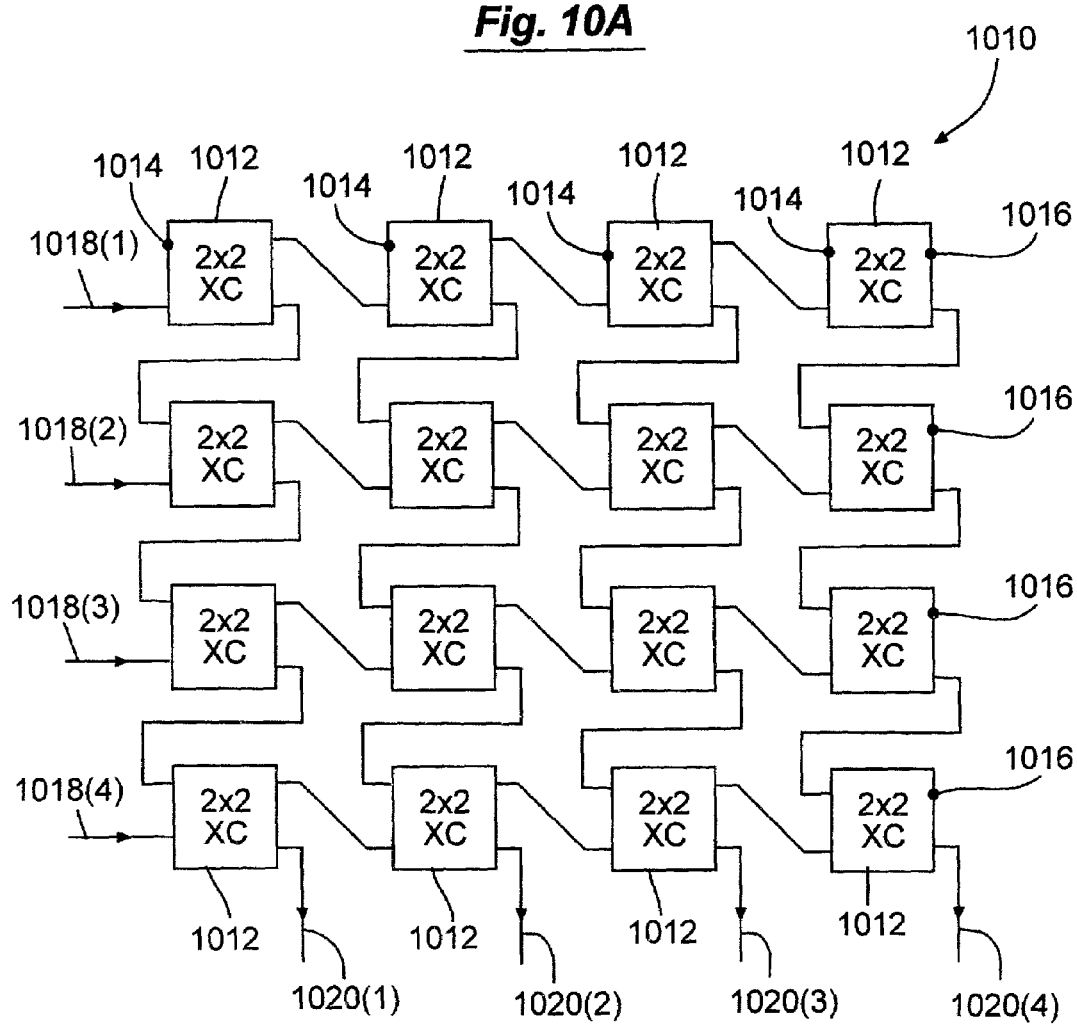
FIGS. 10A–10E are schematic diagrams illustrating alternative cross-connect architectures according to further embodiments of the invention.

FIG. 10A shows an example of a 4×4 crossbar cross connect 1010. This 4×4 cross connect 1010 comprises a two-dimensional arrangement of 2×2 cross connects 1012, each of which may be configured according to the broadcast-and-select or distribute-and-select architectures described above. The input signals 1018 are received by respective ones of the 2×2 cross connects 1012 distributed along a first dimension of the array. The output signals 1020 are emitted by respective ones of the cross connects along the second dimension of the array.

Within the array, one of the two output ports for each 2×2 cross connect 1012 is optically connected with an input port of the next 2×2 cross connect 1012 in the first of the two dimensions and the second of the two output ports is optically connected with an input port of the next 2×2 cross connect 1012 in the second of the two dimensions. Each of the edge 2×2 cross connects 1012 at the opposite side of the array from where the output signals 1020 are emitted has one unused input port 1014 since there is no 2×2 cross connect 1012 to couple with that input port 1014 in the first dimension. Similarly, each of the edge 2×2 cross connects 1012 at the opposite side of the array from where the input signals 1018 are received has one unused output port 1016 since there is no 2×2 cross connect 1012 to couple with that output port 1016 in the second dimension.

It is apparent how a more general K×K crossbar cross connect architecture may be provided with a K×K array of 2×2 cross connects configured in the same fashion as FIG. 10A but extended even further in the two dimensions of the array. Except for the edge elements where optical signals are received or transmitted, or have corresponding unused ports, each 2×2 element in the array receives a signal from an element next to it in both directions in the array and transmits a signal to an element next to it in both directions. Such a generalized crossbar cross connect still functions to distribute a plurality of spectral bands on the K input optical signals among the K output optical signals as desired.

2. Benes Cross Connect

Figure 10B:
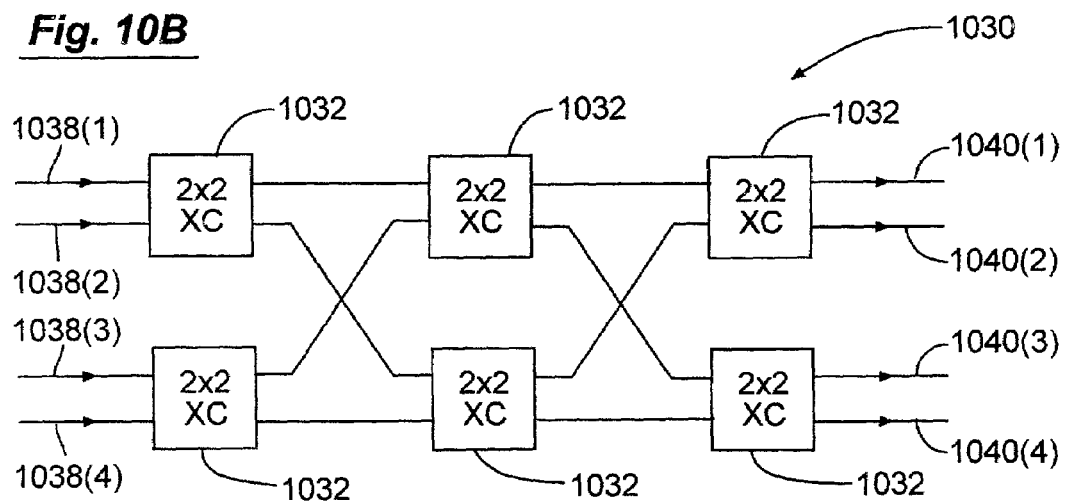

FIG. 10B provides an illustration of a 4×4 Benes cross connect 1030 configured to distribute spectral bands from multiplexed input optical signals 1038 among output optical signals 1040 as desired according to a configuration of the component 2×2 cross connects 1032. In this embodiment, six 2×2 cross connects 1032 are provided and configured as illustrated. The Benes cross connect 1030 includes three pairs of 2×2 cross connects 1032. The first pair receives the four input signals 1038 at its four input ports and the third pair transmits the four output signals 1040 at its four output ports. Each of the intermediate pair of 2×2 cross connects 1032 receives at its input ports signals from each of the first pair of 2×2 cross connects 1032 and transmits at its output ports signals to each of the third pair of 2×2 cross connects 1032. It will be appreciated that the example of a 4×4 Benes cross connect is used for illustrative purposes only. More generally, the Benes configuration may be used to construct K×K cross connects from a plurality of smaller component cross connects, such as with 2×2 cross connects.

3. Benes Cross Connect with Spatial Dilation

Figure 10C:
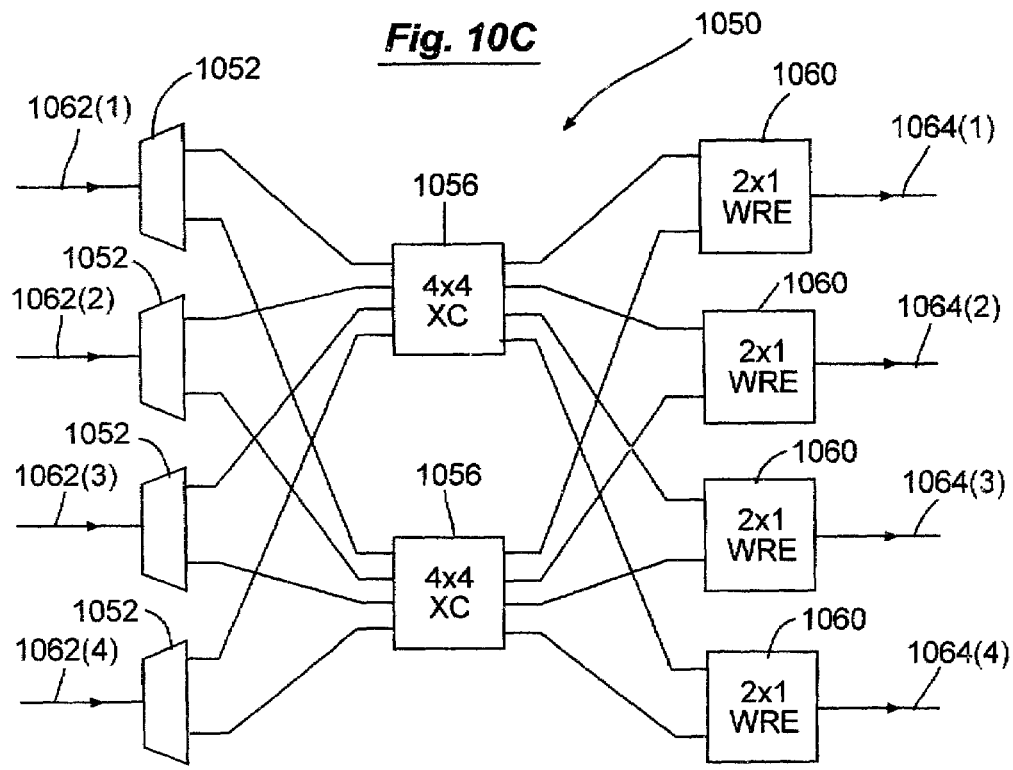

FIG. 10C provides an illustration of a 4×4 Benes cross connect with spatial dilation 1050. As for the other embodiments, the cross connect 1050 distributes spectral bands from multiplexed input optical signals 1062 among output optical signals 1064 as desired according to a configuration of the cross connect 1050. In this embodiment, two 4×4 cross connects 1056 are used in combination with four 2×1 WREs 1060. Each of the four input signals 1062 encounters an optical splitter 1052 to direct a duplicate of each input signal to each of the 4×4 cross connects 1056. Each of the 2×2 WREs 1060 is similarly configured to receive one of the outputs from each of the 4×4 cross connects 1056. The spatial dilation of the architecture has the effect of overcoming the rearrangably nonblocking character of the Benes architecture. It thus allows for a strictly nonblocking arrangement without requiring rearrangements when switching new connections. It will be appreciated that the example of a 4×4 Benes cross connect with spatial dilation is used for illustrative purposes only. More generally, the Benes configuration with spatial dilation may be used to construct K×K cross connects by increasing the capacity of the intermediate cross connects 1056.

4. Clos Cross Connect

Figure 10D:
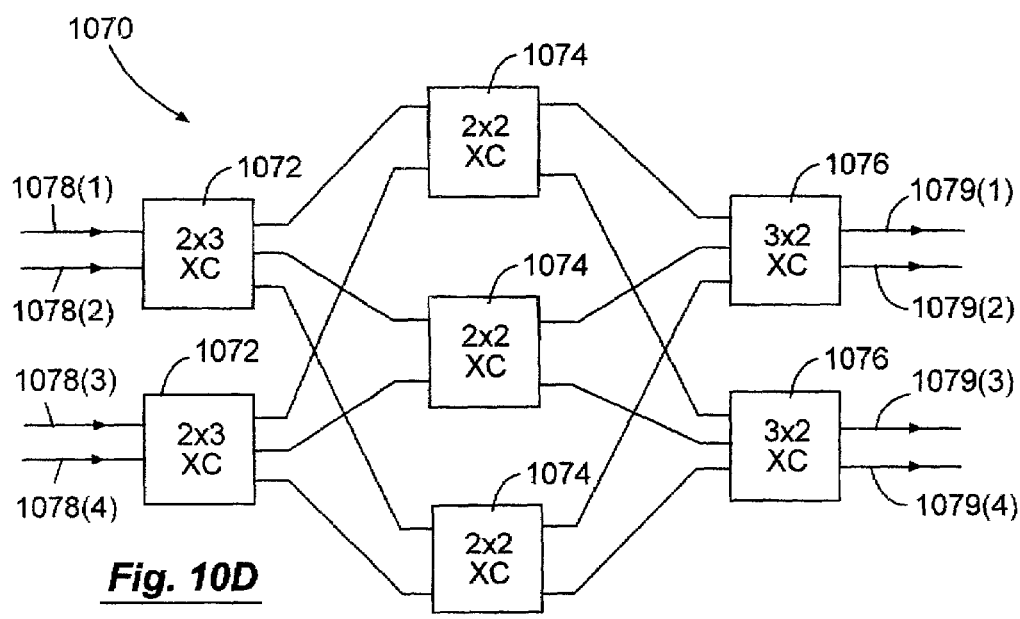

FIG. 10D provides an illustration of a 4×4 Clos cross connect 1070 that distributes spectral bands from multiplexed input optical signals 1078 among output optical signals 1079. The Clos cross connect 1070 comprises three layers of cross connects. The first layer comprises two 2×3 cross connects 1072 that receive the input signals 1078 at their four input ports. The third layer comprises two 3×2 cross connects 1076 that transmit the output signals 1079 from their four output ports. The 2×3 and 3×2 cross connects 1072 and 1076 may be configured in one embodiment as described above with respect to FIGS. 6A and 6B. The intermediate (second) layer comprises three 2×2 cross connects 1074, with each such 2×2 cross connect 1074 being disposed to receive signals at its input ports from both of the first-layer 2×3 cross connects 1072 and to transmit signals from its output ports to both of the third-layer 3×2 cross connects 1079. In certain configurations, the Clos cross connect 1070 effectively operates by using the first layer of 2×3 cross connects 1072 to distribute spectral bands among the 2×2 cross connects 1074 of the intermediate layer; from here, they are routed as desired to the 3×2 cross connects 1076 of the third layer for integration as desired onto the output signals 1079.

Figure 10E:
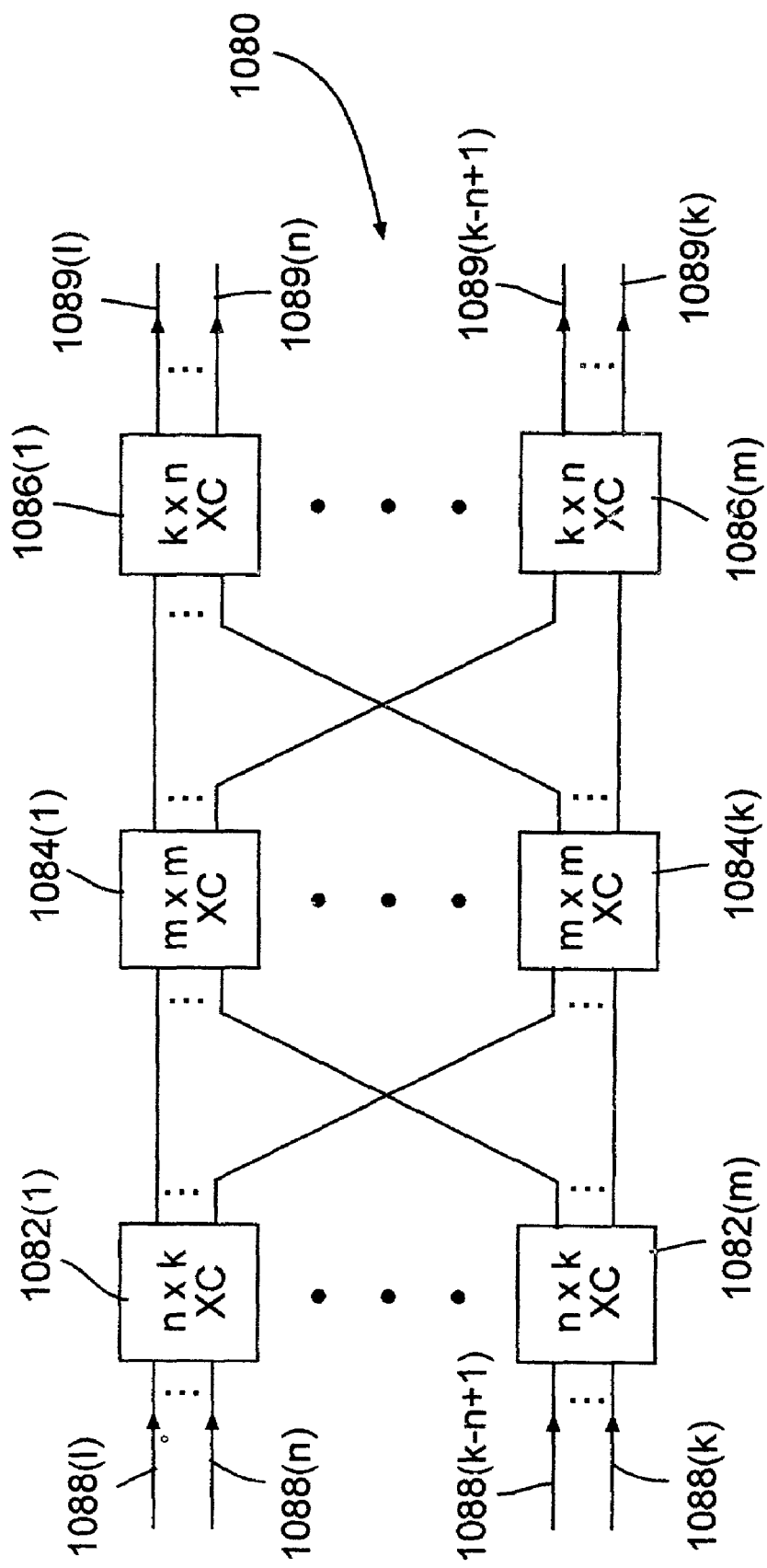

The basic structure of the Clos cross connect may be generalized as shown in FIG. 10E to act as a K×K cross connect 1080 for distributing a plurality of spectral bands on K input signals 1088 among K output signals 1089. As for the 4×4 Clos cross connect discussed with respect to FIG. 10D, the generalized Clos cross connect 1080 comprises three layers of elemental cross connects. The first layer comprises a plurality m of n×k cross connects 1082 that receive the K input signals 1088. In an embodiment where the number of input ports provided by the n×k cross connects is exactly equal to the number K of input signals, m=K/n, although this is not a necessary requirement for an operation cross connect 1080. Similarly, the third layer comprises a plurality m of k×n elemental cross connects that transmit the K output signals 1089. The intermediate layer comprises a plurality k of m×m cross connects 1084 disposed so that each m×m cross connect 1084 receives signals from all of the first-layer n×k cross connects 1082 at its input ports and provides signals to all of the third-layer k×n cross connects 1086 from its output ports. For the generalized cross connect 1080 to operate without spectral bands blocking each other during their propagation through the system, k≧2n−1. Thus, in an embodiment where this nonblocking criterion is met exactly, k=2n−1.

A number of special cases of the Clos cross-connect configuration are explicitly noted. For example, the 4×4 Benes cross connect described with respect to FIG. 10B is equivalent to the configuration 1080 of FIG. 10E in the special case where n=m=k=2, and is therefore an example of a configuration in which the nonblocking criterion is not met exactly. The 4×4 Clos cross connect described with respect to FIG. 10D corresponds to nearly the same circumstances, but meets the nonblocking criterion exactly by having n=m=2 and k=3. Examples of larger cross connects that meet the nonblocking criterion exactly include an 8×8 cross connect in which n=2, k=3, and m=4, and a 16×16 cross connect in which n=2, k=3, and m=8. Still other examples of cross connects that may be formed are evident from the description above.

Having described several embodiments, it will be recognized by those of skill in the art that various modifications, alternative constructions, and equivalents may be used without departing from the spirit of the invention. In particular, a number of examples have been provided illustrating discrete principles. Alternative embodiments may include elements in arrangements that use multiple of those principles. Accordingly, the above description should not be taken as limiting the scope of the invention, which is defined in the following claims.

What is claimed is:

1. An optical wavelength cross connect for receiving a plurality of input optical signals each having a plurality of spectral bands and transmitting a plurality of output optical signals each having one or more of the spectral bands, the optical wavelength cross connect comprising:

a first plurality of wavelength routing elements, each such wavelength routing element adapted for selectively routing subsets of spectral bands between a first optical signal and different ones of a plurality of second optical signals according to a configurable state of such wavelength routing element, wherein each of the first plurality of wavelength routing elements is disposed to receive at least one optical signal corresponding to one of the input optical signals, wherein:

a mapping of the spectral bands comprised by the plurality of input optical signals to the plurality of output optical signals is determined by the states of the first plurality of wavelength routing elements;

at least one of the first plurality of wavelength routing elements is comprised by a protection fabric and the remainder of the first plurality of wavelength routing elements are comprised by a working fabric; and the optical wavelength cross connect further comprises a plurality of working optical switches each configured to transmit a respective one of the output optical signals either as a working signal received from the working fabric or a protection signal received from the protection fabric.

2. The optical wavelength cross connect recited in claim 1 wherein the working fabric includes a plurality of optical amplifiers, each disposed to amplify one of the working signals prior to transmission to its respective working optical switch.

3. The optical wavelength cross connect recited in claim 1 wherein the protection fabric includes a protection optical switch disposed to transmit the protection signal to one of the working optical switches depending upon a state of the protection optical switch.

4. The optical wavelength cross connect recited in claim 3 wherein the protection fabric further includes an optical amplifier disposed to amplify the protection signal prior to transmission to one of the working optical switches.

5. The optical wavelength cross connect recited in claim 1 further comprising a plurality of optical splitters each disposed to intercept one of the input optical signals and to transmit an equivalent of such one of the input optical signals to each of the first plurality of wavelength routing elements, wherein each wavelength routing element is disposed to receive equivalents corresponding to each of the input optical signals and to transmit the respective working signal depending on the state of such wavelength routing element.

6. The optical wavelength cross connect recited in claim 1 wherein the at least one wavelength routing element comprised by the protection fabric is disposed to receive an equivalent of each of the input signals and to transmit the protection signal with spectral bands corresponding to desired spectral bands on one of the output optical signals depending on the state of that wavelength routing element.

7. The optical wavelength cross connect recited in claim 1 further comprising:

a plurality of optical splitters each disposed to intercept one of the input optical signals and to transmit an equivalent of such one of the input optical signals to one of the first plurality of wavelength routing elements comprised by the working fabric and to transmit each equivalent of the at least one wavelength routing element comprised by the protection fabric; and a second plurality of wavelength routing elements disposed to transmit the working signals to the working optical switches, wherein outputs of the each of the first plurality of wavelength routing elements are optically connected an input to each of the second plurality of wavelength routing elements.

8. The optical wavelength cross connect recited in claim 7 wherein the plurality of input optical signals, outputs from each of the first plurality of wavelength routing elements, and inputs to each of the second plurality of wavelength routing elements are equal in number.

9. The optical wavelength cross connect recited in claim 1 wherein the working fabric further comprises a plurality of optical performance monitors disposed to measure optical characteristics of the working signals.

10. The optical wavelength cross connect recited in claim 1 wherein the protection fabric further comprises at least one optical performance monitor disposed to measure optical characteristics of the protection signal.

11. The optical wavelength cross connect recited in claim 1 further comprising a plurality of optical splitters each disposed to intercept one of the input optical signals and to transmit an equivalent of such one of the input optical signals to each of the first plurality of wavelength routing elements, wherein each wavelength routing element is disposed to receive equivalents corresponding to each of the input optical signals and to transmit the respective output optical signal depending on the state of such wavelength routing element.

12. The optical wavelength cross connect recited in claim 1 further comprising a second plurality of wavelength routing elements disposed to transmit the output optical signal, wherein outputs of the each of the first plurality of wavelength routing elements are optically connected with an input to each of the second plurality of wavelength routing elements.

13. The optical wavelength cross connect recited in claim 1 further comprising a plurality of optical performance monitors disposed to measure optical characteristics of the input optical signals.

14. The optical wavelength cross connect recited in claim 1 further comprising a plurality of optical performance monitors disposed to measure optical characteristics of the output optical signals.

15. The optical wavelength cross connect recited in claim 1 further comprising a plurality of optical supervisory channels disposed to drop one or more spectral bands from the input optical signals.

16. The optical wavelength cross connect recited in claim 1 further comprising a plurality of optical supervisory channels disposed to add one or more spectral bands to the output optical signals.

17. The optical wavelength cross connect recited in claim 1 wherein at least one of the first plurality of wavelength routing elements comprises a four-pass wavelength routing element.

18. The optical wavelength cross connect recited in claim 1 wherein at least one of the first plurality of wavelength routing elements comprises a two-pass wavelength routing element.

19. A K×K optical wavelength cross connect for receiving K input optical signals each having a plurality of spectral bands and transmitting K output optical signals each having one or more of the spectral bands, the optical wavelength cross connect comprising an array of interconnected optical wavelength cross connects, at least one of which is smaller than K×K and includes a plurality of wavelength routing elements, each such wavelength routing element adapted for selectively routing subsets of spectral bands between a first optical signal and different ones of a plurality of second optical signals according to a configurable state of such wavelength routing element, wherein a mapping of the spectral bands comprised be the plurality of input optical signals to the plurality of output optical signals is determined by states of the interconnected optical wavelength cross connects.

20. The K×K optical wavelength cross connect recited in claim 19 wherein the array of interconnected optical wavelength cross connects is configured as a crossbar array.

21. The K×K optical wavelength cross connect recited in claim 19 wherein the array of interconnected optical wavelength cross connects is configured as a Benes array.

22. The K×K optical wavelength cross connect recited in claim 19 wherein the array of interconnected optical wavelength cross connects is configured as a Benes array with spatial dilation.

23. The K×K optical wavelength cross connect recited in claim 19 wherein the array of interconnected optical wavelength cross connects is configured as a Clos array.

24. The K×K optical wavelength cross connect recited in claim 19 wherein the array of interconnected optical wavelength cross connects comprises:

a first layer having a plurality m of n×k optical wavelength cross connects;

a second layer having a plurality k of m×m optical wavelength cross connects; and a third layer having a plurality m of k×n optical wavelength cross connects, wherein each optical wavelength cross connect included in the second layer receives an intermediate input signal from each of the optical wavelength cross connects included in the first layer and transmits an intermediate output signal to each of the optical wavelength cross connects included in the third layer.

25. The K×K optical wavelength cross connect recited in claim 24 wherein $k=2n-1$.

* * * * *